(12) United States Patent
Fujita et al.

(10) Patent No.: US 7,300,992 B2
(45) Date of Patent: Nov. 27, 2007

(54) VINYL POLYMERS AND PROCESSES FOR PRODUCING THE SAME

(75) Inventors: Nao Fujita, Settsu (JP); Yousuke Asai, Settsu (JP); Yoshiki Nakagawa, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/503,210

(22) PCT Filed: Apr. 7, 2003

(86) PCT No.: PCT/JP03/04385

§ 371 (c)(1),
(2), (4) Date: Aug. 3, 2004

(87) PCT Pub. No.: WO03/085004

PCT Pub. Date: Oct. 16, 2003

(65) Prior Publication Data

US 2005/0159572 A1    Jul. 21, 2005

(30) Foreign Application Priority Data

Apr. 8, 2002    (JP) .............................. 2002-105239
Aug. 19, 2002   (JP) .............................. 2002-238406

(51) Int. Cl.
*C08F 118/02*    (2006.01)
(52) U.S. Cl. ..................... 526/319; 526/325
(58) Field of Classification Search ................ 526/319, 526/325
See application file for complete search history.

(56) References Cited

FOREIGN PATENT DOCUMENTS

| | | |
|---|---|---|
| EP | 1 090 930 | 4/2001 |
| EP | 1 153 942 | 11/2001 |
| EP | 1 197 499 | 4/2002 |
| EP | 1 197 499 A1 * | 4/2002 |
| EP | 1 209 170 | 5/2002 |
| JP | 04-045105 | 2/1992 |
| JP | 2001-81129 | 3/2001 |
| WO | WO 94/10227 | 5/1994 |

\* cited by examiner

*Primary Examiner*—Robert D. Harlan
(74) *Attorney, Agent, or Firm*—Kenyon & Kenyon LLP

(57) ABSTRACT

The present invention relates to a method for producing a vinyl polymer retaining the ability for atom transfer radical polymerization, a method for reliably producing a vinyl polymer having terminal functional groups, a vinyl polymer having functional groups prepared by these methods, and a curable composition comprising the polymer. A vinyl polymer having terminal functional groups can be reliably produced through the steps of preparing a vinyl polymer by atom transfer radical polymerization of a vinyl monomer in a polymerization solvent in the presence of a polymerization initiator and a transition metal complex functioning as a polymerization catalyst, removing the polymerization solvent and the vinyl monomer while the ability for atom transfer radical polymerization is maintained, and supplying a functional-group-introducing agent having a low polymerizability to introduce a functional group to a polymer terminus. During the step of supplying the functional-group-introducing agent, a functional-group-introducing solvent having a dielectric constant higher than that of the functional-group-introducing agent may be supplied to effectively introduce a functional group to a terminus of the vinyl polymer. Furthermore, according to the present invention, the polymerization solvent and the functional-group-introducing agent can be recovered and recycled.

21 Claims, No Drawings

VINYL POLYMERS AND PROCESSES FOR PRODUCING THE SAME

This application is a 371 national phase application of PCT/JP03/04385 filed on 7 Apr. 2003, claiming priority to JP 2002-105239, filed on 08 Apr. 2002, and JP 2002-238406 filed 19 Aug. 2002, the contents of which are incorporated herein by reference in their entirety.

TECHNICAL FIELD

The present invention relates to a method for producing a vinyl polymer having functional groups introduced therein, a vinyl polymer having functional groups introduced therein made by this method, and a curable composition containing the polymer.

BACKGROUND ART

It is a well-known fact that functional-group-terminated polymers alone or in combination with suitable curing agents can provide cured products having high heat resistance and high durability by crosslinking. Representative examples of such polymers are polymers having alkenyl groups, hydroxy groups, or crosslinkable silyl groups at the termini.

Alkenyl-terminated polymers can be crosslinked by photoreaction or in the presence of hydrosilyl-containing compounds functioning as curing agents. Hydroxyl-terminated polymers are cured by the formation of urethane crosslinks resulting from the reaction with polyisocyanates. Polymers having crosslinkable silyl groups at the termini are cured by absorption of moisture in the presence of suitable condensation catalysts.

Main chain skeletons of the polymers having alkenyl groups, hydroxyl groups, or crosslinkable silyl groups at the termini consist of, for example, polymers prepared by ionic polymerization or condensation polymerization. Examples of such main chain polymers include polyether polymers such as polyethylene oxide, polypropylene oxide, and polytetramethylene oxide; hydrocarbon polymers such as polybutadiene, polyisoprene, polychloroprene, polyisobutylene, and hydrogenated products thereof; and polyester polymers such as polyethylene terephthalate, polybutylene terephthalate, and polycaprolactone. These polymers are used in various applications depending on the main chain structure and the type of crosslinks. On the other hand, vinyl polymers prepared by radical polymerization and having functional groups at the termini are not currently put to practical application.

Among vinyl polymers, (meth)acrylic polymers have particularly high weather resistance and high transparency, neither of which can be achieved by polyether polymers, hydrocarbon polymers, or polyester polymers. Thus, (meth)acrylic polymers having alkenyl groups or crosslinkable silyl groups in the side chains are applied to weather-resistant paints and the like. Vinyl polymers having alkenyl groups or crosslinkable silyl groups at the termini instead of in the side chain can provide cured products having superior physical properties. Thus, many researchers have investigated simplified methods for producing vinyl polymers having terminal functional groups.

However, in the preparation of vinyl polymers, inhibition of the side reaction is difficult; thus, polymers having a target molecular weight and a uniform molecular weight distribution cannot be readily produced. Moreover, introduction of functional groups to specific positions is particularly difficult. Methods for industrially producing vinyl polymers having terminal functional groups have not been reported so far.

For example, Japanese Unexamined Patent Application Publication No. 5-255415 teaches a method for producing a (meth)acrylic polymer having alkenyl groups at both termini by the reaction with an alkenyl-containing disulfide functioning as a chain transfer agent. Japanese Unexamined Patent Application Publication No. 5-262808 teaches a method for producing a (meth)acrylic polymer, including the steps of preparing a (meth)acrylic polymer having hydroxyl groups at both termini by the reaction with a hydroxyl-containing disulfide, and introducing the alkenyl groups into both termini by utilizing the reactivity of the hydroxyl groups. However, reliable introduction of alkenyl groups into the both termini is not easy according to these methods. In order to reliably introduce functional groups to both termini, a large quantity of a chain transfer agent must be used, and this poses a problem in the manufacturing process.

Furthermore, the present inventors have discovered a method for introducing a functional group into a terminus of a polymer, including the step of polymerizing a vinyl polymer by the living radical polymerization described below; adding a compound containing a functional group and an alkenyl group having a low polymerizability, the compound functioning as an agent for introducing the functional group; and allowing the alkenyl group to react with a terminus of the polymer.

However, this method also has a possibility of not being able to reliably introduce only one functional group into a terminus of the polymer. This is attributable to the following two reasons: One is a decrease in catalytic activity. Depending on the type and/or the quantity of the agent for introducing the functional group, the polarity of the system may change as a result of the addition of the agent, thereby decreasing the catalytic activity. The other is the introduction of a plurality of functional groups due to the presence of the monomer during the step of introducing the functional group. During the step of adding the functional-group-introducing agent, the polymerizable monomer is preferably absent; however, at the end stage of the polymerization, the reaction becomes gradually slower, and trace amounts of polymerizable monomers remain as a result. When the polymerizable monomers are present during the step of adding the functional-group-introducing agent, it is sometimes difficult to control the number of functional groups introduced into one end. After the reaction between the radically propagating terminus and the functional-group-introducing agent, the terminus (having the functional group) normally has low radical reaction activity; thus, it is less likely that the terminus will further react with another molecule of the functional-group-introducing agent. However, when a polymerizable monomer is present in the reaction system during the reaction between the radically propagating terminus and the functional-group-introducing agent, it is possible that the polymerizable monomer having high polymerizability will react with this terminus of the polymer. Once the polymerizable monomer is added to the terminus, the terminus regains high activity and starts to react with another molecule of the functional-group-introducing agent. A plurality of molecules of the functional-group-introducing agent will be introduced in the polymer as a result of the addition of the polymerizable monomer to the terminus and the reaction with the new molecule of the functional-group-introducing agent after the reaction between the radically propagating terminus and the functional-group-introducing agent. When this occurs, it becomes more difficult to introduce one molecule of the functional-group-introducing agent into one terminus of the polymer.

In order to control the rate of introduction of the functional group, the amount of remaining monomer at the end stage of the polymerization may be analyzed so that the functional-group-introducing agent can always be fed at a constant degree of polymerization. However, this requires a complicated process analysis step. According to an approach that does not conduct process analysis, a significantly long time is required before the degree of polymerization reaches a steady state.

When a compound having two alkenyl groups having a low polymerizability is used as the functional-group-introducing agent and the feed amount of the agent is equal to or less than the number of the active termini, both functional groups may react, thereby coupling two polymer termini. In order to reliably introduce the functional groups into the two termini of the polymer, the agent must be charged in an amount larger than that of the propagating termini. In some cases, it is preferable to add an excessive amount of the functional-group-introducing agent in order to increase the reaction rate and to reliably introduce the functional group into the termini. The excess functional-group-introducing agent is recovered after the introduction of the functional group by a process such as distillation under a reduced pressure. These compounds are preferably recycled. In particular, when the functional-group-introducing agent is expensive, recycling of these compounds is particularly important in the manufacturing process.

When a polymerization solvent is used in the polymerization of the vinyl polymer, the polymerization solvent is recovered with the functional-group-introducing agent during the step of recovering the functional-group-introducing agent by reduced-pressure distillation. The polymerization solvent containing the functional-group-introducing agent cannot be recycled as a polymerization solvent since functional groups are introduced into the main chain before a predetermined molecular weight is reached. In order to recycle the solvent as a polymerization solvent, the polymerization solvent must be isolated from the functional-group-introducing agent.

Two or more compounds can be isolated from each other by various techniques, e.g., crystallization and adsorption. Among these, a distillation isolation technique is popular. According to this technique, two or more compounds are isolated from each other based on the difference in boiling point. The isolation is highly difficult when the difference between the boiling points of the compounds is small or when an azeotropic composition is contained. In other words, when the difference between the boiling point of the polymerization solvent and the boiling point of the functional-group-introducing agent is small or when an azeotropic composition is contained, the polymerization solvent and the functional-group-introducing agent can rarely be isolated from each other and thus cannot be recycled as a polymerization solvent and a functional-group-introducing agent, respectively. This poses a problem in the manufacturing process. For example, although 1,7-octadiene (a functional-group-introducing agent) and acetonitrile (a polymerization solvent) have a difference in boiling point of at least 30° C., the present inventors have found that they also contain an azeotropic composition. In such a system, the two components cannot be isolated from each other unless special distillation, such as azeotropic distillation requiring the addition of a third component, is conducted. Furthermore, it is highly difficult to find a suitable third component.

As is described above, the following must be considered in order to reliably introduce one functional group into one terminus of the polymer: a decrease in catalytic activity due to the functional-group-introducing agent; recovery of the functional-group-introducing agent and isolation of the agent from the polymerization solvent; and the timing of addition of the functional-group-introducing agent at a particular degree of polymerization in order to reliably achieve a constant rate of introduction of the functional group.

DISCLOSURE OF THE INVENTION

An object of the present invention is to provide a polymer having a functional group at a terminus and a predetermined molecular weight, a method for producing the polymer, and a curable composition containing the polymer. Another object of the present invention is to provide a method for efficiently producing the polymer at low cost by respectively recovering the polymerization solvent and the functional-group-introducing agent at high purities to allow recycling.

The present invention relates to a method for making a vinyl polymer having a terminus to which a functional-group-introducing agent is added. The method includes a step of supplying the functional-group-introducing agent having a low polymerizability and a functional-group-introducing solvent having a dielectric constant higher than that of the functional-group-introducing agent to a polymerization system after 80 percent by weight or more of a vinyl monomer is consumed by atom transfer radical polymerization in a polymerization solvent in the presence of a polymerization initiator and a transition metal complex functioning as a polymerization catalyst. In this method, 1 to 1,000 parts by weight of the functional-group-introducing solvent to 100 parts by weight of the vinyl monomer is supplied.

In the above-described method, the polymerization solvent and the vinyl monomer are preferably removed by reduced-pressure distillation while the ability for atom radical transfer polymerization is maintained after 80 percent by weight or more of the vinyl monomer is consumed.

More preferably, after the polymerization solvent and the vinyl monomer are removed by reduced-pressure distillation, the functional-group-introducing agent is supplied to introduce a functional group.

After the functional-group-introducing agent is supplied to introduce the functional group, the functional-group-introducing agent or a mixture of the functional-group-introducing agent and the functional-group-introducing solvent is preferably removed by reduced-pressure distillation.

The present invention also relates to a polymer produced by the above-described production method.

The present invention also relates to a curable composition containing the above-described polymer.

BEST MODE FOR CARRYING OUT THE INVENTION

In the present invention, atom transfer radical polymerization of a vinyl monomer is conducted in a polymerization solvent in the presence of a polymerization initiator and a transition metal complex functioning as a polymerization catalyst. After the consumption of 80 percent by weight of the vinyl monomer, an agent for introducing a functional group (a functional-group-introducing agent) having a low polymerizability and a solvent for introducing the functional group (functional-group-introducing solvent) are fed to produce a vinyl polymer in which a molecule of the functional-group-introducing agent is added to each terminus. The functional-group-introducing solvent has a higher dielectric constant than that of the functional-group-introducing agent and is supplied in an amount of 1 to 1,000 parts by weight to 100 parts by weight of the vinyl monomer.

Controlling radical polymerization is generally difficult due to a high polymerization rate and frequent terminations of the reaction resulting from radical coupling. On the other hand, living radical polymerization yields less frequent termination of the reaction and can produce polymers having a narrow molecular weight distribution, i.e., Mw/Mn of 1.1 to 1.5. Moreover, the molecular weight can be freely controlled by adjusting the feed ratio of the initiator to the monomer. Thus, according to the living radical polymerization, not only polymers having a narrow molecular weight distribution and a low viscosity can be produced, but also monomers having specific functional groups can be reliably introduced into predetermined positions in almost all cases. Living radical polymerization is thus preferred as a method for producing vinyl polymers having particular functional groups.

The term "living polymerization" in a strict sense refers to a polymerization process in which the propagating termini remain active through the propagation of the molecular chain. In a general (broad) sense, the term includes quasiliving polymerization in which propagation proceeds with equilibrium between active and inactive chains. In the present invention the term "living polymerization" is used in the latter sense.

Living radical polymerization has been extensively investigated by various study groups. Examples include a process using a cobalt porphyrin complex disclosed in J. Am. Chem. Soc., 1994, vol. 116, p. 7943; a process using a radical scavenger such as a nitroxide radical disclosed in Macromolecules, 1994, vol. 27, p. 7288; and atom transfer radical polymerization (ATRP) using an organohalide compound or the like as an initiator and a transition metal complex as a catalyst.

Among various living radical polymerization processes, an ATRP process for polymerizing a vinyl monomer catalyzed by a transition metal complex in the presence of an organohalide compound, a halogenated sulfonyl compound, or the like functioning as an initiator is particularly preferred as the method for producing a vinyl polymer having a specific functional group. This is due to the fact that the ATRP process not only has the advantages of the living radical polymerization, but also allows greater flexibility in designing the initiator or the catalyst since the polymer has a halogen group or the like contributing to the functional group conversion at an end.

Examples of the ATRP processes are disclosed in Matyjaszewski et al., J. Am. Chem. Soc. 1995, vol. 117, p. 5614; Macromolecules, 1995, vol. 28, p. 7901; Science, 1996, vol. 272, p. 866; WO 96/30421; WO 97/18247; and Sawamoto et al., Macromolecules, 1995, vol. 28, p. 1721.

The vinyl monomer used in the production of the vinyl polymer is not particularly limited as long as it is radically polymerizable. Various vinyl monomers may be used.

Examples of the vinyl monomer include (meth)acrylic monomers. Examples of the (meth)acrylic monomers include (meth)acrylic acid and alkyl esters (the number of carbon atoms in the alkyl group: 1 to 50) of (meth)acrylic acid such as methyl(meth)acrylate, ethyl(meth)acrylate, n-propyl(meth)acrylate, isopropyl(meth)acrylate, n-butyl (meth)acrylate, isobutyl(meth)acrylate, tert-butyl(meth) acrylate, n-pentyl(meth)acrylate, n-hexyl(meth)acrylate, cyclohexyl(meth)acrylate, n-heptyl(meth)acrylate, n-octyl (meth)acrylate, 2-ethylhexyl(meth)acrylate, n-nonyl(meth) acrylate, n-decyl(meth)acrylate, n-dodecyl(meth)acrylate, and n-stearyl(meth)acrylate; cyclic alkyl esters (the number of carbon atoms in the cyclic alkyl group: 5 to 50) of (meth)acrylic acid such as cyclohexyl(meth)acrylate; isobornyl esters of (meth)acrylic acid such as isobornyl (meth)acrylate; aryl esters of (meth)acrylic acid (the number of carbon atoms in the aryl group: 6 to 50) of (meth)acrylic acid, such as phenyl(meth)acrylate and toluyl(meth)acrylate; aralkyl esters (the number of carbon atoms in the aralkyl group: 7 to 50) of (meth)acrylic acid such as benzyl (meth)acrylate; alkoxyalkyl esters (the number of carbon atoms in the alkoxy group: 1 to 50, the number of carbon atoms in the alkyl group: 1 to 50) of (meth)acrylic acid, such as 2-methoxyethyl(meth)acrylate, 2-ethoxyethyl(meth)acrylate, and 3-methoxybutyl(meth)acrylate; hydroxyalkyl esters (the number of carbon atoms in the alkyl group: 1 to 50) of (meth)acrylic acid, such as 2-hydroxyethyl(meth) acrylate and 2-hydroxypropyl(meth)acrylate; epoxy-containing alkyl esters (the number of carbon atoms in the alkyl group: 1 to 50) of (meth)acrylic acid, such as glycidyl(meth) acrylate; aminoalkyl esters (the number of carbon atoms in the alkyl group: 1 to 50) of (meth)acrylic acid, such as 2-aminoethyl(meth)acrylate; alkoxysilyl-containing alkyl esters (the number of carbon atoms in the alkoxy group: 1 to 50, the number of carbon atoms in the alkyl group: 1 to 50) of (meth)acrylic acid, such as γ-(methacryloyloxypropyl) trimethoxysilane; ethylene oxide adducts (the number of ethylene oxide adducts: 2 to 50) of (meth)acrylic acid; and fluorine-containing alkyl esters (the number of carbon atoms in the fluorine-containing alkyl group: 1 to 50) of (meth) acrylic acid such as trifluoromethylmethyl(meth)acrylate, 2-trifluoromethylethyl(meth)acrylate, 2-perfluoroethylethyl (meth)acrylate, 2-perfluoroethyl-2-perfluorobutylethyl (meth)acrylate, 2-perfluoroethyl(meth)acrylate, perfluoromethyl(meth)acrylate, diperfluoromethylmethyl(meth) acrylate, 2-perfluoromethyl-2-perfluoroethylmethyl(meth) acrylate, 2-perfluorohexylethyl(meth)acrylate, 2-perfluorodecylethyl(meth)acrylate, and 2-perfluorohexadecylethyl(meth)acrylate. Examples of the vinyl monomer further include styrenic monomers such as styrene, vinyltoluene, α-methylstyrene, chlorostyrene, styrenesulfonic acid, and salts thereof; fluorine-containing vinyl monomers such as perfluoroethylene, perfluoropropylene and vinylidene fluoride; silicon-containing vinyl monomers, e.g., vinylalkoxysilanes such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol. These monomers may be used alone or in combination. Among these monomers, styrenic monomers and (meth)acrylic monomers are preferred from the standpoint of the physical properties of the resulting product. Acrylic ester monomers and in particular butyl acrylate are preferred for their low glass transition temperatures and high reactivity in introducing the functional group.

Examples of the polymerization initiator include organohalide compounds, in particular, organohalide compounds having a highly reactive carbon-halogen bond (for example, an ester compound having a halogen atom in the a position and a compound having a halogen atom in the benzylic position); and sulfonyl halide compounds.

Examples of the organohalide compounds include $C_6H_5$—$CH_2X$, $C_6H_5$—$CHX$—$CH_3$, and $C_6H_5$—$C(X)$$(CH_3)_2$ (wherein X represents a chlorine atom, a bromine atom, or an iodine atom); and $R^7$—$CHX$—$CO_2R^8$, $R^7$—$CX$$(CH_3)$—$CO_2R^8$, $R^7$—$CHX$—$C(O)R^8$, and $R^7$—$CX(CH_3)$—$C(O)R^8$ (wherein $R^7$ and $R^8$ are each a hydrogen atom, a $C_1$-$C_{20}$ alkyl group, a $C_6$-$C_{20}$ aryl group, or a $C_7$-$C_{20}$ aralkyl group; and X represents a chlorine atom, a bromine atom, or an iodine atom).

Examples of the sulfonyl halide compounds used as the polymerization initiator include $R^7$—$C_6H_4$—$SO_2X$ (wherein $R^7$ is a hydrogen atom, a $C_1$-$C_{20}$ alkyl group, a $C_6$-$C_{20}$ aryl group, or a $C_7$-$C_{20}$ aralkyl group; and X represents a chlorine atom, a bromine atom, or an iodine atom).

When atoms transfer radical polymerization of the vinyl monomer is performed in the presence of the organohalide compound or the sulfonyl halide compound functioning as an initiator, a vinyl polymer having a terminal structure represented by formula (6) is produced as a result:

—$CX(R^9)(R^{10})$     (6)

(wherein $R^9$ and $R^{10}$ each represent a group bonded to an ethylenically unsaturated group of the vinyl monomer, and X represents a chlorine atom, a bromine atom, or an iodine atom).

Alternatively, the ATRP initiator may be an organohalide compound or a sulfonyl halide compound having both a functional group that initiates the polymerization and a specific reactive functional group that does not initiate the polymerization. In such a case, the produced vinyl polymer has the specific reactive functional group introduced into one terminus of the main chain while the structure represented by formula (6) is introduced into the other terminus of the main chain.

Examples of the specific reactive functional group include alkenyl, crosslinkable silyl, hydroxyl, epoxy, amino, and amide. Since these groups are highly reactive, another suitable functional group can be introduced into the vinyl polymer in one or more reaction steps.

The organohalide compound having the alkenyl group is not particularly limited. Examples thereof include the compounds represented by the general formula (7):

$R^{12}R^{13}CX$—$R^{14}$—$R^{15}$—$C(R^{11})$=$CH_2$     (7)

(wherein $R^{11}$ represents a hydrogen atom or a methyl group; $R^{12}$ and $R^{13}$ each represent a hydrogen atom, a $C_1$-$C_{20}$ alkyl group, a $C_6$-$C_{20}$ aryl group, or a $C_7$-$C_{20}$ aralkyl group, and may be coupled to each other at free termini; $R^{14}$ represents —COO— (ester), —CO— (keto), or o-, m-, or p-phenylene; $R^{15}$ represents a direct bond or a $C_1$-$C_{20}$ divalent organic group which may include at least one ether bond; and X represents a chlorine atom, a bromine atom, or an iodine atom).

Examples of $R^{12}$ and $R^{13}$ include a hydrogen atom, methyl, ethyl, n-propyl, isopropyl, butyl, pentyl, and hexyl. $R^{12}$ and $R^{13}$ may bond with each other at the other termini to form a cyclic skeleton.

Examples of $R^{15}$ include a direct bond and $C_1$-$C_{20}$ divalent organic groups, each of which may include at least one ether bond. Examples of the $C_1$-$C_{20}$ alkylene group include —$(CH_2)_n$—, wherein n represents an integer between 1 and 20. Examples of the group containing at least one ether bond include —O—$(CH_2)$—, —$(CH_2)_n$—O—, —$(CH_2)_n$—O—$(CH_2)_m$—, wherein $1 \leq m+n \leq 20$).

Examples of the alkenyl-containing organohalide compound represented by general formula (7) include:
$XCH_2COO(CH_2)_nCH$=$CH_2$,
$CH_3CHX$—$COO(CH_2)CH$=$CH_2$,
$(CH_3)_2CX$—$COO(CH_2)_nCH$=$CH_2$,
$CH_3CH_2CHX$—$COO(CH_2)CH$=$CH_2$,

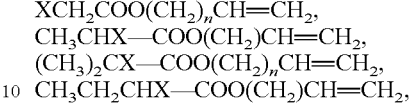

(wherein X represents a chlorine atom, a bromine atom, or an iodine atom; and n represents an integer between 1 to 20),
$XCH_2COO(CH_2)_nO(CH_2)_mCH$=$CH_2$,
$CH_3CHX$—$COO(CH_2)_nO(CH_2)_mCH$=$CH_2$,
$(CH_3)_2CX$—$COO(CH_2)_nO(CH_2)_mCH$=$CH_2$,
$CH_3CH_2CHX$—$COO(CH_2)_nO(CH_2)_mCH$=$CH_2$,

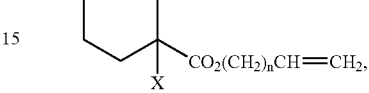

(wherein X represents a chlorine atom, a bromine atom, or an iodine atom; m represents an integer between 0 to 19; n represents an integer between 1 and 20; and $1 \leq m+n \leq 20$),
o, m, p-$XCH_2$—$C_6H_4$—$(CH_2)_n$—$CH$=$CH_2$,
o, m, p-$CH_3CHX$—$C_6H_4$—$(CH_2)_n$—$CH$=$CH_2$,
o, m, p-$CH_3CH_2CHX$—$C_6H_4$—$(CH_2)_n$—$CH$=$CH_2$ (wherein X represents a chlorine atom, a bromine atom, or an iodine atom; and n represents an integer between 1 to 20),
o, m, p-$XCH_2$—$C_6H_4$—$(CH_2)_n$—O—$(CH_2)_m$—$CH$=$CH_2$,
o, m, p-$CH_3CHX$—$C_6H_4$—$(CH_2)_n$—O—$(CH_2)_m$—$CH$=$CH_2$,
o, m, p-$CH_3CH_2CHX$—$C_6H_4$—$(CH_2)_n$—O—$(CH_2)_m$—$CH$=$CH_2$ (wherein X represents a chlorine atom, a bromine atom, or an iodine atom; m represents an integer between 0 to 19; n represents an integer between 1 to 20; and $1 \leq m+n \leq 20$),
o, m, p-$XCH_2$—$C_6H_4$—O—$(CH_2)_n$—$CH$=$CH_2$,
o, m, p-$CH_3CHX$—$C_6H_4$—O— $(CH_2)_n$—$CH$=$CH_2$,
o, m, p-$CH_3CH_2CHX$—$C_6H_4$—O— $(CH_2)_n$—$CH$=$CH_2$, (wherein X represents a chlorine atom, a bromine atom, or an iodine atom; and n represents an integer between 1 to 20; and $1 \leq m+n \leq 20$),
o, m, p-$XCH_2$—$C_6H_4$—O—$(CH_2)_n$—O—$(CH_2)_m$—$CH$=$CH_2$,
o, m, p-$CH_3CHX$—$C_6H_4$—O—$(CH_2)_n$—O—$(CH_2)_m$—$CH$=$CH_2$, and
o, m, p-$CH_3CH_2CHX$—$C_6H_4$—O—$(CH_2)_n$—O—$(CH_2)_m$—$CH$=$CH_2$ (wherein X represents a chlorine atom, a bromine atom, or an iodine atom; m represents an integer between 0 and 19; n represents an integer between 1 and 20; and $1 \leq m+n \leq 20$).

Examples of the alkenyl-containing organohalide compound include compounds represented by general formula (8):

$$CH_2=C(R^{11})-R^{15}-CX(R^{12})-R^{16}-R^{13} \quad (8)$$

(wherein $R^{11}$, $R^{12}$, $R^{13}$, $R^{15}$, and X are the same as above; and $R^{16}$ is a direct bond, —COO— (ester), —CO— (keto), or o-, m-, or p-phenylene).

$R^{15}$ is a direct bond or a $C_1$-$C_{20}$ divalent organic group (which may include at least one ether bond). When $R^{15}$ is a direct bond, the vinyl group bonds to the carbon atom bonding to the halogen atom, thereby producing an allyl halide compound. Since the carbon-halogen bond is activated by the presence of the vinyl group adjacent to the halogen atom, $R^{16}$ needs not be —COO— or a phenylene group but may be a direct bond. When $R^{15}$ is other than the direct bond, $R^{16}$ is preferably —COO—, —CO—, or phenylene to activate the carbon-halogen bond.

Examples of the compounds represented by general formula (8) include:
$CH_2=CHCH_2X$, $CH_2=C(CH_3)CH_2X$,
$CH_2=CHCHX—CH_3$, $CH_2=C(CH_3)CHX—CH_3$,
$CH_2=CHCX(CH_3)_2$, $CH_2=CHCHX—C_2H_5$,
$CH_2=CHCHX—CH(CH_3)_2$, $CH_2=CHCHX—C_6H_5$,
$CH_2=CHCHX—CH_2C_6H_5$, $CH_2=CHCH_2CHX—CO_2R$,
$CH_2=CH(CH_2)_2CHX—CO_2R$,
$CH_2=CH(CH_2)_3CHX—CO_2R$,
$CH_2=CH(CH_2)_8CHX—CO_2R$, $CH_2=CHCH_2CHX—C_6H_5$,
$CH_2=CH(CH_2)_2CHX—C_6H_5$, and
$CH_2=CH(CH_2)_3CHX—C_6H_5$ (wherein X represents a chlorine atom, a bromine atom, or an iodine atom; R represents a $C_1$-$C_{20}$ alkyl group, a $C_6$-$C_{20}$ aryl group, or a $C_7$-$C_{20}$ aralkyl group).

Examples of the alkenyl-containing sulfonyl halide compound include:
o-, m-, p-$CH_2=CH—(CH_2)_n—C_6H_4—SO_2X$ and
o-, m-, p-$CH_2=CH—(CH_2)_n—O—C_6H_4—SO_2X$, wherein X represents a chlorine atom, a bromine atom, or an iodine atom; and n represents an integer between 1 and 20.

The organohalide compound containing crosslinkable silyl is not particularly limited. Examples thereof are compounds represented by general formula (9):

$$R^{12}R^{13}CX-R^{14}-R^{15}-CH(R^{11})-CH_2-[Si(R^{17})_{2-b}(Y)_bO]_m-Si(R^{18})_{3-a}(Y)_a \quad (9)$$

(wherein $R^{11}$, $R^{12}$, $R^{13}$, $R^{14}$, $R^{15}$, and X are the same as above; $R^{17}$ and $R^{18}$ each represent a $C_1$-$C_{20}$ alkyl group, a $C_6$-$C_{20}$ aryl group, a $C_7$-$C_{20}$ aralkyl group, or a triorganosiloxy group represented by $(R')_3SiO—$ (wherein R's are each a $C_1$-$C_{20}$ monovalent hydrocarbon group, and the three R's may be the same or different); when two or more $R^{17}$s or $R^{18}$s are present, they may be the same or different; Y represents a hydroxyl group or a hydrolyzable group; when two or more Ys are present, they may be the same or different; a represents 0, 1, 2, or 3; b represents 0, 1, or 2; m represents an integer between 0 and 19; and $a+mb \geq 1$).

Examples of the compounds represented by general formula (9) include:
$XCH_2COO(CH_2)_nSi(OCH_3)_3$,
$CH_3CHX—COO(CH_2)_nSi(OCH_3)_3$,
$(CH_3)_2CX—COO(CH_2)_nSi(OCH_3)_3$,
$XCH_2COO(CH_2)_nSi(CH_3)(OCH_3)_2$,
$CH_3CHX—COO(CH_2)_nSi(CH_3)(OCH_3)_2$, and
$(CH_3)_2CX—COO(CH_2)_nSi(CH_3)(OCH_3)_2$ (wherein X represents a chlorine atom, a bromine atom, or an iodine atom; and n represents an integer between 0 and 20);
$XCH_2COO(CH_2)_nO(CH_2)_mSi(OCH_3)_3$,
$H_3CCHX—COO(CH_2)_nO(CH_2)_mSi(OCH_3)_3$,
$(H_3C)_2CX—COO(CH_2)_nO(CH_2)_mSi(OCH_3)_3$,
$CH_3CH_2CHX—COO(CH_2)_nO(CH_2)_mSi(OCH_3)_3$,
$XCH_2COO(CH_2)_nO(CH_2)_mSi(CH_3)(OCH_3)_2$,
$H_3CCHX—COO(CH_2)_nO(CH_2)_mSi(CH_3)(OCH_3)_2$,
$(H_3C)_2CX—COO(CH_2)_nO(CH_2)_mSi(CH_3)(OCH_3)_2$, and
$CH_3CH_2CHX—COO(CH_2)_nO(CH_2)_mSi(CH_3)(OCH_3)_2$ (wherein X represents a chlorine atom, a bromine atom, or an iodine atom; m represents an integer between 0 to 20; and n represents an integer between 1 and 20); and o, m, p-$XCH_2—C_6H_4—(CH_2)_2Si(OCH_3)_3$,
o, m, p-$CH_3CHX—C_6H_4—(CH_2)_2Si(OCH_3)_3$,
o, m, p-$CH_3CH_2CHX—C_6H_4—(CH_2)_2Si(OCH_3)_3$,
o, m, p-$XCH_2—C_6H_4—(CH_2)_3Si(OCH_3)_3$,
o, m, p-$CH_3CHX—C_6H_4—(CH_2)_3Si(OCH_3)_3$
o, m, p-$CH_3CH_2CHX—C_6H_4—(CH_2)_3Si(OCH_3)_3$
o, m, p-$XCH_2—C_6H_4—(CH_2)_2—O—(CH_2)_3Si(OCH_3)_3$,
o, m, p-$CH_3CHX—C_6H_4—(CH_2)_2—O—(CH_2)_3Si(OCH_3)_3$,
o, m, p-$CH_3CH_2CHX—C_6H_4—(CH_2)_2—O—(CH_2)_3Si(OCH_3)_3$,
o, m, p-$XCH_2—C_6H_4—O—(CH_2)_3Si(OCH_3)_3$,
o, m, p-$CH_3CHX—C_6H_4—O—(CH_2)_3Si(OCH_3)_3$,
o, m, p-$CH_3CH_2CHX—C_6H_4—O—(CH_2)_3Si(OCH_3)_3$,
o, m, p-$XCH_2—C_6H_4—O—(CH_2)_2—O—(CH_2)_3—Si(OCH_3)_3$,
o, m, p-$CH_3CHX—C_6H_4—O—(CH_2)_2—O—(CH_2)_3—Si(OCH_3)_3$, and
o, m, p-$CH_3CH_2CHX—C_6H_4—O—(CH_2)_2—O—(CH_2)_3—Si(OCH_3)_3$ (wherein X represents a chlorine atom, a bromine atom, or an iodine atom).

Examples of the organohalide compound containing crosslinkable silyl further include compounds represented by general formula (10):

$$(R^{18})_{3-a}(Y)_aSi-[OSi(R^{17})_{2-b}(Y)_b]_m-CH_2-CH(R^{11})-R^{15}-CX(R^{12})-R^{16}-R^{13} \quad (10)$$

(wherein $R^{11}$, $R^{12}$, $R^{13}$, $R^{15}$, $R^{16}$, $R^{17}$, $R^{18}$, a, b, m, X, and Y are the same as above).

Examples of such compounds include:
$(CH_3O)_3SiCH_2CH_2CHX—C_6H_5$,
$(CH_3O)_2(CH_3)SiCH_2CH_2CHX—C_6H_5$,
$(CH_3O)_3Si(CH_2)_2CHX—CO_2R$,
$(CH_3O)_2(CH_3)Si(CH_2)_2CHX—CO_2R$,
$(CH_3O)_3Si(CH_2)_3CHX—CO_2R$,
$(CH_3O)_2(CH_3)Si(CH_2)_3CHX—CO_2R$,
$(CH_3O)_3Si(CH_2)_4CHX—CO_2R$,
$(CH_3O)_2(CH_3)Si(CH_2)_4CHX—CO_2R$,
$(CH_3O)_3Si(CH_2)_9CHX—CO_2R$,
$(CH_3O)_2(CH_3)Si(CH_2)_9CHX—CO_2R$,
$(CH_3O)_3Si(CH_2)_3CHX—C_6H_5$,
$(CH_3O)_2(CH_3)Si(CH_2)_3CHX—C_6H_5$,
$(CH_3O)_3Si(CH_2)_4CHX—C_6H_5$, and
$(CH_3O)_2(CH_3)Si(CH_2)_4CHX—C_6H_5$ (wherein X represents a chlorine atom, a bromine atom, or an iodine atom; and R represents a $C_1$-$C_{20}$ alkyl group, $C_6$-$C_{20}$ aryl group, or a $C_7$-$C_{20}$ aralkyl group).

The organohalide compound or sulfonyl halide compound containing a hydroxyl group may be any. Examples thereof include compounds represented by

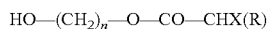
HO—(CH$_2$)$_n$—O—CO—CHX(R)

(wherein X represents a chlorine atom, a bromine atom, or an iodine atom; R represents a hydrogen atom, a C$_1$-C$_{20}$ alkyl group, a C$_6$-C$_{20}$ aryl group, or a C$_7$-C$_{20}$ aralkyl group; and n represents an integer between 1 and 20).

The organohalide compound or sulfonyl halide compound containing an amino group may be any. Examples thereof include compounds represented by

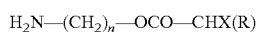
H$_2$N—(CH$_2$)$_n$—OCO—CHX(R)

(wherein X represents a chlorine atom, a bromine atom, or an iodine atom; R represents a hydrogen atom, a C$_1$-C$_{20}$ alkyl group, a C$_6$-C$_{20}$ aryl group, or a C$_7$-C$_{20}$ aralkyl group; and n represents an integer between 1 and 20).

The organohalide compound or sulfonyl halide compound containing an epoxy group may be any. Examples thereof include compounds represented by

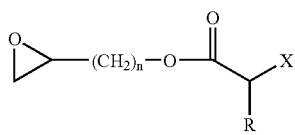

(wherein X represents a chlorine atom, a bromine atom, or an iodine atom; R represents a hydrogen atom, a C$_1$-C$_{20}$ alkyl group, a C$_6$-C$_{20}$ aryl group, or a C$_7$-C$_{20}$ aralkyl group; and n represents an integer between 1 and 20).

In order to prepare a polymer having two or more reactive functional groups per molecule, it is preferable to use a polyfunctional organohalide or sulfonyl halide polymerization initiator having two or more initiation sites.

Examples of the polymerization initiator include
o, m, p-X—CH$_2$—C$_6$H$_4$—CH$_2$—X

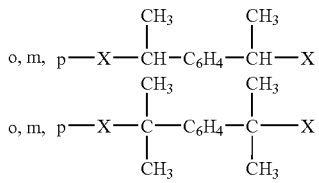

(wherein C$_6$H$_4$ represents a phenylene group; and X represents a chlorine atom, a bromine atom, or an iodine atom)

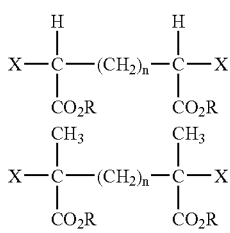

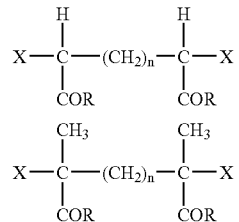

(wherein R represents a C$_1$-C$_{20}$ alkyl group, a C$_6$-C$_{20}$ aryl group, or a C$_7$-C$_{20}$ aralkyl group; n represents an integer between 0 and 20; and X represents a chlorine atom, a bromine atom, or an iodine atom)

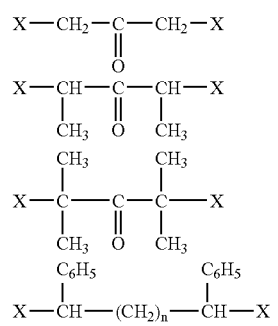

(wherein X represents a chlorine atom, a bromine atom, or an iodine atom; and n represents an integer between 0 and 20)

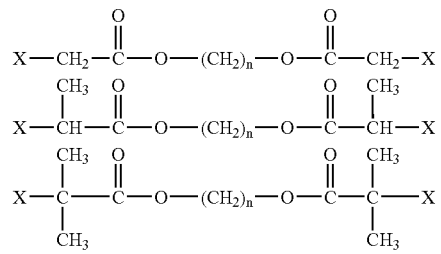

(wherein X represents a chlorine atom, a bromine atom, or an iodine atom; and n represents an integer between 1 and 20)

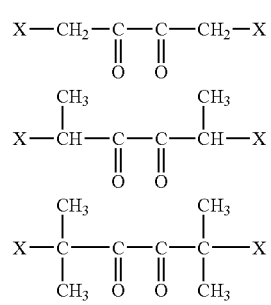

-continued

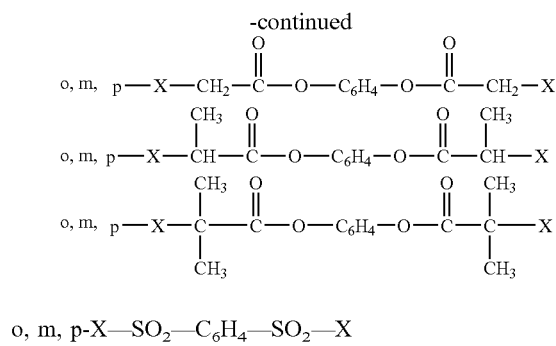

o, m, p-X—SO$_2$—C$_6$H$_4$—SO$_2$—X (wherein X represents a chlorine atom, a bromine atom, or an iodine atom).

Examples of the transition metal complex that functions as the polymerization catalyst include metal complexes having Groups VII, VIII, IX, X, and XI elements as the central metals. Metal complexes having Group VIII, IX, X, or XI metals as the central metals are preferred.

Examples of the central metals include iron, nickel, ruthenium, and copper. Monovalent copper, divalent ruthenium, and divalent iron are preferred, and copper is particularly preferred.

Examples of the metal compound that gives the metal transition complex (i.e., the compound before the ligand coordination) include cuprous chloride, cuprous bromide, cuprous iodide, cuprous cyanide, cuprous oxide, cuprous acetate, and cuprous perchlorate.

Examples of the ligand that coordinates to the metal compound for the transition metal complex include 2,2'-bipyridyl and its derivatives; 1,10-phenanthroline and its derivatives; alkylamines such as tributyl amine; polyamines such as tetramethylethylenediamine, pentamethyldiethylenetriamine, hexamethyltriethylenetetraamine, and tris(2-dimethylaminoethyl)amine; and triphenylphosphine. These ligands may be used alone or in combination. Polyamines and triamines are preferred from the standpoint of reaction control.

When a copper compound is used as the metal compound for the transition metal complex, a ligand for promoting the catalytic activity is generally supplied to produce a transition metal complex. Examples of the ligand include 2,2'-bipyridyl and its derivatives; 1,10-phenanthroline and its derivatives; alkylamines such as tributyl amine; and polyamines such as tetramethylethylenediamine, pentamethyldiethylenetriamine, hexamethyltriethylenetetraamine, and tris(2-dimethylaminoethyl)amine.

When divalent ruthenium chloride is used as the metal compound for the transition metal complex, a ligand, such as triphenylphosphine, is generally used to produce a transition metal complex, such as a tris(triphenylphosphine) complex (RuCl$_2$(PPh$_3$)$_3$).

When the tris(triphenylphosphine) complex (RuCl$_2$(PPh$_3$)$_3$) is used, it is preferable to add an aluminum compound, such as trialkoxyaluminum, to increase its activity.

When divalent iron chloride is used as the metal compound for the transition metal complex, a ligand, such as triphenylphosphine, is generally supplied to produce a transition metal complex, such as a tris(triphenylphosphine) complex (FeCl$_2$(PPh$_3$)$_3$).

The polymerization may be conducted without any solvent or with various solvents. The polymerization may be conducted in an emulsion system, a suspension system, or a system mediated by supercritical fluid CO$_2$.

Examples of the polymerization solvent include hydrocarbon solvents such as benzene and toluene; ether solvents such as diethylether and tetrahydrofuran; halogenated hydrocarbon solvents such as methylene chloride and chloroform; ketonic solvents, such as acetone, methyl ethyl ketone, and methyl isobutyl ketone; alcohol solvents such as methanol, ethanol, propanol, isopropanol, n-butyl alcohol, and tert-butyl alcohol; nitrile solvents such as acetonitrile, propionitrile, and benzonitrile; ester solvents such as ethyl acetate and butyl acetate; and carbonate solvents such as ethylene carbonate and propylene carbonate. These may be used alone or in combination. Nitrile solvents and in particular acetonitrile are preferred since they improve the catalytic stability.

In the present invention, the vinyl polymer is produced by atom transfer radical polymerization of a vinyl monomer in the presence of a polymerization initiator and a transition metal complex catalyst in a polymerization solvent.

Since this polymerization is living polymerization, it is possible to produce a block copolymer by successively feeding vinyl monomers.

The content of the polymerization solvent used is preferably adjusted to achieve sufficient dissolution or dispersion of the catalyst in the polymerization system. In particular, the polymerization solvent content is 0.1 to 300 parts, preferably 1 to 100 parts, and more preferably 5 to 30 parts to 100 parts of the vinyl monomer.

The above-described amounts of the polymerization solvent, the polymerization initiator, and the transition metal complex catalyst are charged in a reactor. To these, a vinyl monomer is, for example, supplied dropwise to prepare a vinyl polymer.

The polymerization temperature is preferably in the range of room temperature to 200° C., and more preferably in the range of 50 to 150° C. from the standpoint of reaction control.

The vinyl polymer is preferably a (meth)acrylic polymer, more preferably an acrylic ester polymer, and most preferably a butyl acrylate polymer.

Here, the term "(meth)acrylic polymer" refers to a polymer containing 50% or more of the (meth)acrylic monomer unit. The (meth)acrylic polymer preferably contains 80% or more of the (meth)acrylic monomer unit. The (meth)acrylic polymer contains 50% or less and more preferably 20% or less of other vinyl monomer unit or units.

The term "acrylic ester polymer" refers to a polymer containing 50% or more of the acrylic ester monomer unit. The acrylic ester polymer preferably contains 80% or more of the acrylic ester monomer unit. The acrylic ester polymer contains 50% or less and more preferably 20% or less of other monomer unit or units.

The term "butyl acrylate polymer" refers to a polymer containing 50% or more of the butyl acrylate unit. The butyl acrylate polymer preferably contains 80% or more of the butyl acrylate unit. The butyl acrylate polymer contains 50% or less and more preferably 20% or less of other monomer unit or units.

In the present invention, a functional-group-introducing agent having a low polymerizability and a functional-group-introducing solvent having a higher dielectric constant than that of the functional-group-introducing agent are supplied after the consumption of 80 percent by weight of the vinyl monomer to produce a vinyl polymer having a functional-group-introducing agent at an end.

When the functional-group-introducing agent is supplied before 80 percent by weight of the vinyl monomer is consumed, the molecular weight of the vinyl polymer often becomes smaller than the target value. Accordingly, the functional-group-introducing agent is preferably supplied after 80 to 99.9 percent by weight and more preferably 85 to 99 percent by weight of the vinyl monomer is consumed.

In the present invention, the polymerization solvent and the vinyl monomer are preferably removed by reduced-pressure distillation while the ability for atom transfer radical polymerization is maintained, after 80 percent by weight of the vinyl monomer is consumed, and before the functional-group-introducing agent is fed. After the polymerization solvent and the vinyl monomer are removed by reduced-pressure distillation while the ability for atom transfer radical polymerization is maintained, the system contains a vinyl polymer having the ability for atom transfer radical polymerization and is substantially free of the residual monomer. Thus, when the functional-group-introducing agent is supplied, a vinyl polymer having a terminal group introduced to a terminus can be produced. Accordingly, it becomes possible to avoid the problems that has conventionally occurred by the addition of the functional-group-introducing agent in the presence of the residual monomers, i.e., the problem of difficulty of controlling the terminal structure and the number of functional groups introduced into one terminus due to the occurrence of random copolymerization resulting from the addition of a highly polymerizable monomer to an active terminus having a functional group. Moreover, it is no longer necessary to conduct a complicated step analysis in which the content of the residual monomer is analyzed at the end stage of the polymerization in order to always add the functional-group-introducing agent at a particular degree of polymerization. A problem of taking a long time before the degree of polymerization becomes steady can also be overcome.

The temperature during the reduced-pressure distillation is preferably 150° C. or less, more preferably 100° C. or less, and most preferably 80° C. or less.

The reduced-pressure distillation may be conducted by atmospheric pressure evaporation or reduced-pressure evaporation. The reduced-pressure distillation may be conducted subsequent to the polymerization at the same temperature so that no additional heating is required, which is preferable from the standpoint of the manufacturing process.

The simplest process for removing the polymerization solvent and the vinyl monomer by reduced-pressure distillation is a batch process. Alternatively, the polymerization solvent and the vinyl monomer may be continuously removed by reduced-pressure distillation with a thin-layer evaporator or the like.

In order for the vinyl polymer to retain the ability for atom transfer radical polymerization after the removal of the polymerization solvent and the vinyl monomer, oxygen contamination during the step of removing the polymerization solvent and the vinyl monomer must be avoided.

The recovered polymerization solvent and the vinyl monomer contain substantially no foreign components and thus can be reused, either directly or after a simple process, such as adjustment of the vinyl monomer content, to produce a new vinyl polymer.

Since the removal of the polymerization solvent and the vinyl monomer by vacuum evaporation is conducted before feeding the functional-group-introducing agent, the recovered material substantially contains only the polymerization solvent and the vinyl monomer. Thus, the purities of the recovered materials after the vacuum evaporation are high, and the recovered materials can be efficiently reused in the next polymerization.

The functional-group-introducing agent may be selected from the compounds represented by general formula (1):

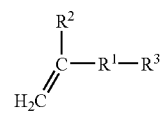

(1)

{wherein $R^3$ represents a hydroxyl group, an amino group, an epoxy group, a carboxylic acid group, an ester group, an ether group, an amido group, a silyl group, a group represented by general formula (2):

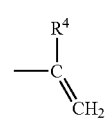

(2)

(wherein $R^4$ represents a hydrogen atom or a methyl group), or a $C_1$-$C_{20}$ organic group containing no polymerizable olefin; $R^1$ represents a $C_1$-$C_{20}$ alkylene group or a group represented by general formula (3):

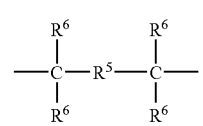

(3)

(wherein $R^5$ is a $C_1$-$C_{20}$ organic group which may contain an oxygen atom or a nitrogen atom; and $R^6$s each represent a hydrogen atom or a methyl group and may be the same or different); and $R^2$ represents a hydrogen atom or a methyl group}.

The compound having two alkenyl groups having a low polymerizability for use in introducing alkenyl groups is selected from the compounds represented by general formula (4):

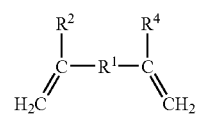

(4)

{wherein $R^1$ represents a $C_1$-$C_{20}$ alkylene group or a group represented by general formula (3):

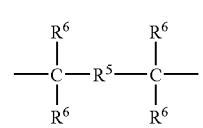

(3)

(wherein $R^5$ is a $C_1$-$C_{20}$ organic group which may contain an oxygen atom or a nitrogen atom; and $R^6$s each represent a hydrogen atom or a methyl group and may be the same or different); and $R^2$ and $R^4$ each represent a hydrogen atom or a methyl group}.

R² and R⁴ may each represent a hydrogen atom or methyl but are preferably a hydrogen atom. When R¹ represents a $C_1$-$C_{20}$ $C_{20}$ alkylene, the structure of the compound is not particularly limited, but may be represented by general formula (5), for example:

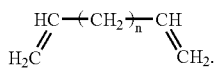
(5)

In view of the availability of the starting material, n is preferably 2, 4, or 6.

Specific examples of R¹ in general formula (1) include:
—$(CH_2)_n$— (wherein n represents an integer between 1 and 20), —$CH(CH_3)$—, —$CH(CH_2CH_3)$—, —$C(CH_3)_2$—, —$C(CH_3)$ $(CH_2CH_3)$—, —$C(CH_2CH_3)_2$—, —$CH_2CH(CH_3)$—, —$(CH_2)_n$—O—$CH_2$— (wherein n represents an integer between 1 and 19), —$CH(CH_3)$—O—$CH_2$—, —$CH(CH_2CH_3)$—O—$CH_2$—, —$C(CH_3)_2$—O—$CH_2$—, —$C(CH_3)$ $(CH_2CH_3)$—O—$CH_2$—, —$C(CH_2CH_3)_2$—O—$CH_2$—, —$(CH_2)_n$—O—$(CH_2)_m$— (wherein m and n are each an integer between 1 and 19; and $2 \leq m+n \leq 20$),
—$(CH_2)_n$—C(O)O—$(CH_2)_m$— (wherein m and n are each an integer between 1 and 19; and $2 \leq m+n \leq 20$),
—$(CH_2)_n$—OC(O)—$(CH_2)_m$—C(O)O—$(CH_2)_l$— (wherein l is an integer between 0 and 18; m and n are each an integer between 1 and 17; and $2 \leq l+m+n \leq 20$),
—$(CH_2)_n$-o-, m-, p-$C_6H_4$—, —$(CH_2)_n$-o-, m-, p-$C_6H_4$—$(CH_2)_m$—(wherein m represents an integer between 0 and 13; n represents an integer between 1 to 14; and $1 \leq m+n \leq 14$),
—$(CH_2)_n$-o-, m-, p-$C_6H_4$—O—$(CH_2)_m$— (wherein m represents an integer between 0 and 13; n represents an integer between 1 and 14; and $1 \leq m+n \leq 14$),
—$(CH_2)_n$-o-, m-, p-$C_6H_4$—O—$CH(CH_3)$— (wherein n represents an integer between 1 and 12),
—$(CH_2)_n$-o-, m-, p-$C_6H_4$—O—$CH(CH_3)_2$— (wherein n represents an integer between 1 and 11),
—$(CH_2)_n$-o-, m-, P—$C_6H_4$—C(O)O—$(CH_2)_m$— (wherein m and n are each an integer between 1 and 12; and $2 \leq m+n \leq 13$),
—$(CH_2)_n$—OC(O)-o-, m-, p-$C_6H_4$—C(O)O—$(CH_2)_m$— (wherein m and n are each an integer between 1 and 11; and $2 \leq m+n \leq 12$),
—$(CH_2)_n$-o-, m-, p-$C_6H_4$—OC(O)—$(CH_2)_m$— (wherein m and n are each an integer between 1 and 12; and $2 \leq m+n \leq 13$), and
—$(CH_2)_n$—C(O)O-o-, m-, p-$C_6H_4$—$(CH_2)_m$— (wherein m and n are each an integer between 1 and 11; and $2 \leq m+n \leq 12$).

Examples of R³ include the following groups:

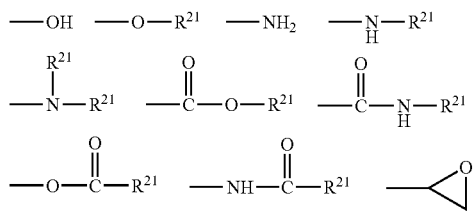

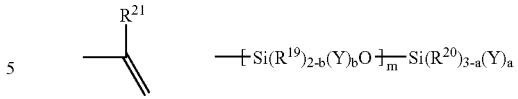

(wherein R¹⁹ and R²⁰ each represent a $C_1$-$C_{20}$ alkyl group, a $C_6$-$C_{20}$ aryl group, a $C_7$-$C_{20}$ aralkyl group, or a triorganosiloxy group represented by $(R')_3SiO$— (wherein R's are each a $C_1$-$C_{20}$ monovalent hydrocarbon group and may be the same or different); when two or more R¹⁹s or R²⁰s are present, they may be the same or different; Y represents a hydroxyl group or a hydrolyzable group; when two or more Ys are present, they may be the same or different; a represents 0, 1, 2, or 3; b represents 0, 1, or 2; m represents an integer between 0 and 19; $a+mb \geq 1$; and R²¹ represents a $C_1$-$C_{20}$ hydrocarbon group).

Specific examples of R²¹ include the following groups:
—$(CH_2)_n$—$CH_3$,
—$CH(CH_3)$—$(CH_2)_n$—$CH_3$,
—$CH(CH_2CH_3)$—$(CH_2)_n$—$CH_3$,
—$CH(CH_2CH_3)_2$,
—$C(CH_3)_2$—$(CH_2)_n$—$CH_3$,
—$C(CH_3)(CH_2CH_3)$—$(CH_2)$—$CH_3$,
—$C_6H_5$,
—$C_6H_5(CH_3)$,
—$C_6H_4(CH_3)_2$,
—$(CH_2)_n$—$C_6H_5$,
—$(CH_2)_n$—$C_6H_4(CH_3)$, and
—$(CH_2)_n$—$C_6H_3(CH_3)_2$, (wherein n represents an integer of 0 or more; and the total number of carbon atoms in each group is 20 or less).

The silyl group is not particularly limited but preferably has m of 0 in the above-described formulae.

The compound containing an amino group, a hydroxy group, or a carboxylic acid group may be directly reacted with a terminus of the polymer. There may be cases where these groups adversely affect the polymer terminus or the catalyst. In such cases, a compound with a protective group may be used. Examples of the protective group include an acetyl group, a silyl group, and an alkoxy group.

As the functional-group-introducing agent, any compound having a functional group that can be added to the vinyl polymer having the ability for atom transfer radical polymerization and a target functional group desired to be introduced into the vinyl polymer can be used without limitation. Specific examples include 1,7-octadiene, 1,5-hexadiene, 1,9-decadiene, allyl alcohol, pentenol, and hexenol. 1,7-Octadiene, 1,5-hexadiene, and 1,9-decadiene are particularly preferred in view of the availability of the starting materials and the physical properties of the resulting polymer and a hardened product of the polymer.

The amount of the functional-group-introducing agent is not particularly limited. Since the functional-group-introducing agent preferably contains a functional group having a low polymerizability, the amount is preferably high in order to increase the reaction rate. In order to reduce the cost, the amount is preferably substantially equivalent to the number of the propagating termini. Thus, the amount of the functional-group-introducing agent is preferably adjusted according to demand.

The amount of the functional-group-introducing agent having two or more alkenyl groups having a low polymerizability supplied to introduce the alkenyl groups to the termini is preferably approximately two times or more larger than that of the propagating termini. When the amount is equal to or less than the amount of the propagating termini, both alkenyl groups may react to couple the polymerization termini. When the compound contains two alkenyl groups having the same reactivity, coupling occurs at a particular statistical probability based on the excess amount of the functional-group-introducing agent. Thus, the amount of the functional-group-introducing agent is preferably at least 1.5 times, more preferably at least 3 times, and most preferably at least 5 times that of the polymerization termini. The upper limit is preferably 30 times that of the polymerization termini in view of polarity of the system.

The alkenyl group represented by general formula (1) and having a double bond consisting of only hydrogen and carbon atoms is generally known to have a low radical polymerizability. Such an alkenyl group rarely induces radical transfer reaction. Thus, when the polymerization solvent and the remaining vinyl monomer are removed and then the functional-group-introducing agent is supplied, the functional-group-introducing agent reacts with the vinyl polymer retaining the ability for atom transfer radical polymerization. As a result, substantially one molecule of the functional-group-introducing agent attaches to a terminus of the vinyl polymer, thereby producing a polymer having one functional group at an end.

The reaction between the functional-group-introducing agent and the vinyl polymer having the ability for atom transfer radical polymerization proceeds in a living state. The transition metal complex catalyzes the reaction between the functional-group-introducing agent and the vinyl polymer having the ability for atom transfer radical polymerization.

Certain types of functional-group-introducing agent having a low polymerizability may decrease the polarity of the reaction system and the activity of the polymerization catalyst. The polarity of the reaction system and the reactivity can be increased by supplying a functional-group-introducing solvent having a dielectric constant higher than that of the functional-group-introducing agent. Examples of the functional-group-introducing solvent are not limited to but include hydrocarbon compounds such as benzene and toluene; ether compounds such as diethylether and tetrahydrofuran; halogenated hydrocarbon compounds such as methylene chloride and chloroform; ketonic compounds such as acetone, methyl ethyl ketone, and methyl isobutyl ketone; alcohol compounds such as methanol, ethanol, propanol, isopropanol, n-butyl alcohol, and tert-butyl alcohol; nitrile compounds such as acetonitrile, propionitrile, and benzonitrile; ester compounds such as ethyl acetate and butyl acetate; and carbonate compounds such as ethylene carbonate and propylene carbonate. These solvents may be used alone or in combination. The solvent may be the same as or different from the polymerization solvent but is preferably the same to facilitate recovery after the reaction. The dielectric constant of the functional-group-introducing solvent is preferably at least 3 higher, and more preferably at least 5 higher, and most preferably at least 10 higher than that of the functional-group-introducing agent. The higher the dielectric constant of the functional-group-introducing solvent, the larger the effect of improving the polarity. Herein, the dielectric constant is the value at 20° C. Among these solvents, nitrile compounds are preferred, and acetonitrile is more preferred in view of improving the catalytic stability.

The content of the functional-group-introducing agent is preferably 1 to 1,000 parts by weight (hereinafter, simply "parts"), more preferably 5 to 500 parts, and most preferably 10 to 100 parts to 100 parts of the vinyl monomer at the initiation of the reaction. The content of the functional-group-introducing solvent is preferably 1 to 10,000 parts, and more preferably 10 to 1,000 parts to 100 parts of the functional-group-introducing agent. If the content of the solvent for introducing the functional group is excessively small, the polarity of the system cannot be sufficiently increased. If the content of the solvent is excessively high, the recovery after the polymerization would be difficult.

The excess functional-group-introducing agent can be recovered, for example, together with the functional-group-introducing solvent by reduced-pressure distillation and can be reused. This is of a great industrial advantage. According to this method including the steps of producing a vinyl polymer by atom transfer radical polymerization of a vinyl monomer, removing the polymerization solvent and the vinyl monomer by reduced-pressure distillation while the ability for atom transfer radical polymerization is maintained, and subsequently supplying the functional-group-introducing agent, the functional-group-introducing agent is prevented from becoming mixed with the polymerization solvent or unreacting vinyl monomers. Thus, isolation of the functional-group-introducing agent from the polymerization solvent or the unreacted vinyl monomers for the purpose of recycling is no longer necessary. In contrast, according to a conventional technique in which the polymerization solvent and the vinyl monomer are not removed by reduced-pressure distillation, the functional-group-introducing agent is recovered together with the polymerization solvent and the vinyl monomer; thus, an isolation process is necessary.

In the present invention, the excess functional-group-introducing agent and functional-group-introducing solvent are recovered after the introduction of the functional groups. The recovery is usually done by reduced-pressure distillation. If the heat resistance of the polymer is sufficient, the system may be heated to a temperature equal to or higher than the temperature for functional-group introduction so as to increase the distillation rate. These compounds may be directly removed by reduced-pressure distillation from the reactor, but continuous distillation, such as a technique using a thin-layer evaporator, is more efficient. The functional-group-introducing solvent recovered by the reduced-pressure distillation can be reused as a mixture of the functional-group-introducing agent and the functional-group-introducing solvent for use in the step of functional group introduction. In this manner, the functional-group-introducing solvent can be recycled separate from the polymerization solvent. Here, an adequate amount of the functional-group-introducing agent may be supplied to the mixture so as to compensate for the loss that occurs during the introduction of the functional group.

The terminal structure of the polymer produced by the present invention is represented by general formula (11). The vinyl polymer having such an terminal structure is characterized in that approximately one functional group is bonded to a polymer terminus directly through a carbon-carbon bond without intervened by any heteroatom.

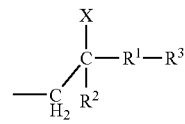

(11)

{wherein $R^3$ represents a hydroxyl group, an amino group, an epoxy group, a carboxylic acid group, an ester group, an ether group, an amido group, a silyl group, a group represented by general formula (2):

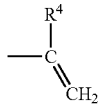
(2)

(wherein $R^4$ represents a hydrogen atom or a methyl group), or a $C_1$-$C_{20}$ organic group containing no polymerizable olefin; $R^1$ represents a $C_1$-$C_{20}$ alkylene group or a group represented by general formula (3):

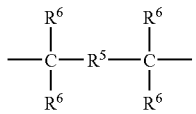
(3)

(wherein $R^5$ is a $C_1$-$C_{20}$ organic group which may contain an oxygen atom or a nitrogen atom; and $R^6$s each represent a hydrogen atom or a methyl group and may be the same or different); $R^2$ represents a hydrogen atom or a methyl group; and X represents a halogen group}.

In general formula (11), specific examples of $R^1$ include the following:
—$(CH_2)_n$— (wherein n is an integer between 1 and 20),
—$CH(CH_3)$—, —$CH(CH_2CH_3)$—, —$C(CH_3)_2$—,
—$C(CH_3)(CH_2CH_3)$—, —$C(CH_2CH_3)_2$—,
—$CH_2CH(CH_3)$—, —$(CH_2)_n$—O—$CH_2$— (wherein n is an integer between 1 and 19),
—$CH(CH_3)$—O—$CH_2$—, —$CH(CH_2CH_3)$—O—$CH_2$—,
—$C(CH_3)_2$—O—$CH_2$—, —$C(CH_3)(CH_2CH_3)$—O—$CH_2$—, —$C(CH_2CH_3)$,
—$(CH_2)_n$—O—$(CH_2)_m$— (wherein m and n each represent an integer between 1 and 19; and $2 \leq m+n \leq 20$),
—$(CH_2)_n$—C(O)O—$(CH_2)_m$— (wherein m and n each represent an integer between 1 and 19; and $2 \leq m+n \leq 20$),
—$(CH_2)_n$—OC(O)—$(CH_2)_m$—C(O)O—$(CH_2)_l$— (wherein l represents an integer between 0 and 18; m and n each represent an integer between 1 and 17; and $2 \leq l+m+n \leq 20$),
—$(CH_2)_n$-o-, m-, p-$C_6H_4$—, —$(CH_2)_n$-o-, m-, p-$C_6H_4$—$(CH_2)_m$—is an integer between 0 and 13; n is an integer between 1 and 14; and $1 \leq m+n \leq 14$),
—$(CH_2)_n$-o-, m-, p-$C_6H_4$—O—$(CH_2)_m$— (wherein m is an integer between 0 and 13; n is an integer between 1 and 14; and $1 \leq m+n \leq 14$),
—$(CH_2)_n$-o-, m-, p-$C_6H_4$—O—$CH(CH_3)$— (wherein n is an integer between 1 and 12),
—$(CH_2)_m$-o-, m-, p-$C_6H_4$—O—$CH(CH_3)_2$— (wherein n represents an integer between 1 and 11),
—$(CH_2)_n$-o-, m-, p-$C_6H_4$—C(O)O—$(CH_2)_m$— (wherein m and n each represent an integer between 1 and 12; and $2 \leq m+n \leq 13$),
—$(CH_2)_n$—OC(O)-o-, m-, p-$C_6H_4$—C(O)O—$(CH_2)_m$— (wherein m and n each represent an integer between 1 and 11; and $2 \leq m+n \leq 12$),
—$(CH_2)_n$-o-, m-, p-$C_6H_4$—OC(O)—$(CH_2)_m$— (wherein m and n each represent an integer between 1 and 12; and $2 \leq m+n \leq 13$), and
—$(CH_2)_n$—C(O)O-o-, m-, p-$C_6H_4$—$(CH_2)_m$— (wherein m and n each represent an integer between 1 and 11; and $2 \leq m+n \leq 12$).

Examples of $R^3$ include the following:

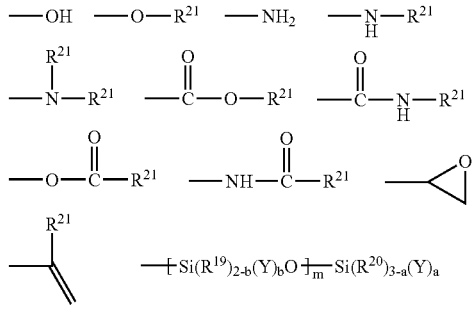

In the above-described formula, $R^{19}$ and $R^{20}$ each represent a $C_1$-$C_{20}$ alkyl group, a $C_6$-$C_{20}$ aryl group, a $C_7$-$C_{20}$ aralkyl group, or a triorganosiloxy group represented by $(R')_3SiO$— (wherein R's are each a $C_1$-$C_{20}$ monovalent hydrocarbon group, and the three R's may be the same or different); when two or more $R^{19}$s or $R^{20}$s are present, they may be the same or different; Y represents a hydroxyl group or a hydrolyzable group; when two or more Ys are present, they may be the same or different; a represents 0, 1, 2, or 3; b represents 0, 1, or 2; m represents an integer between 0 and 19; and $a+mb \geq 1$.

$R^{21}$ represents a $C_1$-$C_{20}$ hydrocarbon group. Examples of $R^{21}$ include the following:
—$(CH_2)_n$—$CH_3$,
—$CH(CH_3)$—$(CH_2)_n$—$CH_3$,
—$CH(CH_2CH_3)$—$(CH_2)_n$—$CH_3$,
—$CH(CH_2CH_3)_2$,
—$C(CH_3)_2$—$(CH_2)_n$—$CH_3$,
—$C(CH_3)(CH_2CH_3)$—$(CH_2)_n$—$CH_3$,
—$C_6H_5$,
—$C_6H_5(CH_3)$,
—$C_6H_4(CH_3)_2$,
—$(CH_2)_n$—$C_6H_5$,
—$(CH_2)_n$—$C_6H_4(CH_3)$, and
—$(CH_2)_n$—$C_6H_3(CH_3)_2$, (wherein n is an integer of 0 or more; and the total number of carbon atoms in each group is 20 or less).

In general formula (12), $R^2$ may be a hydrogen atom or a methyl group but is preferably a hydrogen atom. X is preferably a halogen group and more preferably a bromo group in view of ease of production.

When an alkenyl group is introduced into a terminus and $R^1$ is a $C_1$-$C_{20}$ alkylene group, the structure is not particularly limited. An example thereof is as follows:

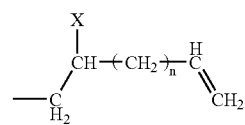

In view of the availability of the starting materials, n is preferably 2, 4, or 6.

The number of terminal functional groups per polymer molecule is not particularly limited. When the polymer is for use in a curable composition or the like, the number is preferably 0.5 to 5, more preferably 1 to 3, and most preferably 1.5 to 2.5.

The polymer produced by the present invention preferably has a molecular weight distribution of less than 1.8, more preferably 1.6 or less, and most preferably 1.3 or less. The molecular weight distribution here is the ratio of the weight-average molecular weight to the number-average molecular weight determined by gel permeation chromatography.

The number-average molecular weight of the polymer produced in the present invention is preferably in the range of 500 to 100,000, and more preferably 3,000 to 50,000. At a molecular weight of 500 or less, the polymer cannot exhibit its inherent characteristics. At a molecular weight of 100,000 or more, handling becomes difficult.

The functional group introduced into the polymer made according to the present invention may be directly used or may be subjected to another conversion reaction to introduce another functional group.

For example, an alkenyl group at a polymer terminus may be converted into a crosslinkable silyl group through hydrosilylation with a hydrosilane compound having a crosslinkable silyl group. Any alkenyl-terminated vinyl polymer prepared by the above-described process may be used.

The hydrosilane compound is not particularly limited. Representative examples include the compounds represented by general formula (12):

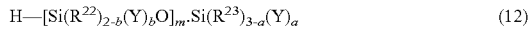  (12)

(wherein $R^{22}$ and $R^{23}$ each represent a $C_1$-$C_{20}$ alkyl group, a $C_6$-$C_{20}$ aryl group, a $C_7$-$C_{20}$ aralkyl group, or a triorganosiloxy group represented by $(R')_3SiO$— (wherein R's are each a $C_1$-$C_{20}$ monovalent hydrocarbon group, and the three R's may be the same or different); when two or more $R^{22}$s or $R^{23}$s are present, they may be the same or different; Y represents a hydroxyl group or a hydrolyzable group; when two or more Ys are present, they may be the same or different; a represents 0, 1, 2, or 3; b represents 0, 1, or 2; m represents an integer between 0 and 19; and a+mb≧1).

The hydrolyzable group represented by Y is not particularly limited and may be one known in the art. Examples of the hydrolyzable group include hydrogen, a halogen atom, an alkoxy group, acyloxy group, a ketoximate group, an amino group, an amido group, an acid amido group, an aminooxy group, a mercapto group, and an alkenyloxy group. An alkoxy group, which is mildly hydrolyzable and is easy to handle, is particularly preferred. The number of hydroxyl groups or hydrolyzable groups that can bond to one silicon atom is 1 to 3. Thus, the total number of the hydrolyzable group, i.e., a+mb, is preferably in the range of 1 to 5. When two or more hydrolyzable or hydroxyl groups are bonded in the reactive silicon group, the hydrolyzable or hydroxy groups may be the same or different. The number of the silicon atom in the crosslinkable silicon compound may be one or more, and may be about up to 20 when the silicon atoms are bonded through siloxane bonds.

Specific examples of $R^{22}$ and $R^{23}$ in general formula (12) include alkyl groups such as a methyl group and an ethyl group; cycloalkyl groups such as a cyclohexyl group; aryl groups such as a phenyl group; aralkyl groups such as a benzyl group; and triorganosilyl groups represented by $(R')_3SiO$— wherein R's are each a methyl group, a phenyl group, or the like.

Among the hydrosilane compounds, those having a crosslinkable group represented by general formula (13) are preferred due to their wide availability:

  (13)

(wherein $R^{23}$, Y, and a are the same as above). Examples of the hydrosilane compounds having a crosslinkable group represented by general formula (12) or (13) include the following:

$HSiCl_3$, $HSi(CH_3)Cl_2$, $HSi(CH_3)_2Cl$, $HSi(OCH_3)_3$, $HSi(CH_3)(OCH_3)_2$, $HSi(CH_3)_2OCH_3$, $HSi(OC_2H_5)_3$, $HSi(CH_3)(OC_2H_5)_2$, $HSi(CH_3)_2OC_2H_5$, $HSi(OC_3H_7)_3$, $HSi(C_2H_5)(OCH_3)_2$, $HSi(C_2H_5)_2OCH_3$, $HSi(C_6H_5)(OCH_3)_2$, $HSi(C_6H_5)_2(OCH_3)$, $HSi(CH_3)(OC(O)CH_3)_2$, $HSi(CH_3)_2O$—$[Si(CH_3)_2O]_2.Si(CH_3)(OCH_3)_2$, and $HSi(CH_3)[O$—$N=C(CH_3)_2]_2$ (wherein $C_6H_5$ represents a phenyl group).

The addition reaction of the crosslinkable-silyl-containing hydrosilane compound to the vinyl polymer having a terminal alkenyl group is conducted in the presence of a hydrosilylation catalyst. Examples of the hydrosilylation catalyst include radical initiators, such as organic peroxides and azo compounds, and transition metal catalysts.

The radical initiator is not particularly limited but may be of any kind. Examples of the radical initiator include dialkyl peroxides such as di-tert-butyl peroxide, 2,5-dimethyl-2,5-di(tert-butylperoxy)hexane, 2,5-dimethyl-2,5-di(tert-butylperoxy)-3-hexyne, dicumylperoxide, tert-butylcumylperoxide, and α,α'-bis(tert-butylperoxy)isopropylbenzene; diacyl peroxides such as benzoyl peroxide, p-chlorobenzoyl peroxide, m-chlorobenzoyl peroxide, 2,4-dichlorobenzoyl peroxide, and lauroyl peroxide; peroxyesters such as tert-butyl peroxybenzoate; peroxydicarbonates such as diisopropyl peroxydicarbonate and di-2-ethylhexyl peroxydicarbonate; and peroxyketals such as 1,1-di(tert-butylperoxy)cyclohexane and 1,1-di(tert-butylperoxy)-3,3,5-trimethylcyclohexane.

Examples of the transition metal catalyst include elemental platinum, platinum dispersed on a carrier such as alumina, silica or carbon black, chloroplatinic acid, complexes of chloroplatinic acid with alcohol, aldehyde, ketone, and the like, platinum-olefin complexes, and a platinum (0)-divinyltetramethyldisiloxane complex. Examples of the catalyst other than the platinum compounds include $RhCl(PPh_3)_3$, $RhCl_3$, $RuCl_3$, $IrCl_3$, $FeCl_3$, $AlCl_3$, $PdCl_2.H_2O$, $NiCl_2$, and $TiCl_4$. These catalysts may be used alone or in combination.

The hydrosilylation catalyst content is not particularly limited but is preferably $10^{-1}$ to $10^{-8}$ mol and more preferably $10^{-3}$ to $10^{-6}$ mol per mole of terminal alkenyl groups of the vinyl polymer. A hydrosilylation catalyst content less than $10^{-8}$ mol may result in insufficient hardening. The upper limit is preferably $10^{-1}$ mol since the hydrosilylation catalyst is expensive.

When an alkenyl-terminated vinyl polymer is reacted with allyl alcohol or methallyl alcohol, a polymer terminus having an active group, such as a halogen group, and a hydroxyl group on neighboring carbon atoms is produced as a result. This polymer terminus can be converted into an epoxy group by cyclization. The cyclization may be conducted by any method but preferably through reaction with an alkaline compound. The alkaline compound is not particularly limited. Examples of the alkaline compound include KOH, NaOH, $Ca(OH)_2$, ammonia, and various amines.

The hydroxyl group at the terminus of the vinyl polymer is converted into an alkenyl group by condensation with allyl chloride, allyl bromide, or the like in the presence of the alkaline compound. Alternatively, the hydroxyl group is converted into an epoxy group by the similar reaction in the presence of epichlorohydrin.

The hydroxyl or amino group at the terminus of the vinyl polymer may be converted into a crosslinkable silyl group by the reaction with a compound having both a crosslinkable silyl group and a functional group reactive with the hydroxyl or amino group. Examples of the functional group reactive with the hydroxyl or amino group include halogen, carboxylic acid halide, carboxylic acid, and isocyanate. Isocyanate is preferred since the compound is widely available, the requirements for the reaction with the hydroxyl group are not so stringent, and decomposition of the crosslinkable silyl groups is unlikely to occur.

The isocyanate compound having a crosslinkable silyl group is not particularly limited and any known compound can be used. Specific examples of the isocyanate compound are as follows:

$(CH_3O)_3Si-(CH_2)_n-NCO$,
$(CH_3O)_2(CH_3)Si-(CH_2)_n-NCO$,
$(C_2H_5O)_3Si-(CH_2)_n-NCO$,
$(C_2H_5O)_2(CH_3)Si-(CH_2)_n-NCO$,
$(i-C_3H_7O)_3Si-(CH_2)_n-NCO$,
$(i-C_3H_7O)_2(CH_3)Si(CH_2)_n-NCO$,
$(CH_3O)_3Si-(CH_2)_n-NH-(CH_2)_m-NCO$,
$(CH_3O)_2(CH_3)Si-(CH_2)_n-NH-(CH_2)_m-NCO$,
$(C_2H_5O)_3Si-(CH_2)_n-NH-(CH_2)_m-NCO$,
$(C_2H_5O)_2(CH_3)Si-(CH_2)_n-NH-(CH_2)_m-NCO$,
$(i-C_3H_7O)_3Si-(CH_2)_n-NH-(CH_2)_m-NCO$, and
$(i-C_3H_7O)_2(CH_3)Si-(CH_2)_n-NH-(CH_2)_m-NCO$ (wherein n and m each represent an integer between 1 and 20).

For example, the reaction between a hydroxyl-terminated (meth)acrylic polymer and a crosslinkable-silyl-containing isocyanate compound may be conducted in the presence or absence of a solvent. The reaction temperature is preferably 0 to 100° C., and more preferably 20 to 50° C. In order to accelerate the reaction between the hydroxyl group and the isocyanate group, a tin catalyst or a tertiary amine catalyst may be used.

Specific examples of the tin catalyst include tin octylate, dibutyltin diacetate, dibutyltin dilaurate, dibutyltin mercaptide, dibutyltin thiocarboxylate, dibutyltin dimaleate, and dioctyltin thiocarboxylate. Examples of the tertiary amine catalyst include triethylamine, N,N-dimethylcyclohexylamine, N,N,N',N'-tetramethylethylenediamine, N,N,N',N'-tetramethylpropane-1,3-diamine, N,N,N',N'-tetramethylhexane-1,6-diamine, N,N,N',N'',N''-pentamethyldiethylenetriamine, N,N,N',N'',N''-pentamethyldipropylenetriamine, tetramethylguanidine, triethylenediamine, N,N'-dimethylpiperazine, N-methylmorpholine, 1,2-dimethylimidazole, dimethylaminoethanol, dimethylaminoethoxyethanol, N,N,N'-trimethylaminoethylethanolamine, N-methyl-N'-(2-hydroxyethyl)piperazine, N-(2-hydroxyethyl)morpholine, bis(2-dimethylaminoethyl) ether, and ethylene glycol bis(3-dimethyl)aminopropyl ether.

The vinyl polymer having a terminal functional group produced according to the present invention may be used in a curable composition. The curable composition of the present invention may contain the vinyl polymer having a terminal functional group, a plasticizer, a filler, and the like. Examples of the plasticizer include phthalic acid esters such as dioctyl phthalate, dibutyl phthalate, diheptyl phthalate, di(2-ethylhexyl)phthalate, and butylbenzyl phthalate; non-aromatic dibasic acid esters such as dioctyl adipate, dioctyl sebacate, dibutyl sebacate, and isodecyl succinate; aliphatic esters such as butyl oleate and methyl acetyl ricinolate; esters of polyalkylene glycol, such as diethylene glycol dibenzoate, triethylene glycol dibenzoate, and pentaerythritol ester; phosphoric esters such as tricresyl phosphate and tributyl phosphate; trimellitic esters; polystyrenes such as polystyrene and poly-α-methylstyrene; polybutadiene, polybutene, polyisobutylene, butadiene-acrylonitrile, and polychloroprene; chlorinated paraffins; hydrocarbon oils such as alkyldiphenyl and partially hydrogenated terphenyl; process oils; polyethers such as polyether polyols, e.g., polyethylene glycol, polypropylene glycol, and polytetramethylene glycol, and derivatives obtained by converting the hydroxyl groups of these polyether polyols into ester or ether groups; epoxy plasticizers such as epoxidized soybean oil and benzyl epoxy stearate; polyester plasticizers obtained from dibasic acids, such as sebacic acid, adipic acid, azelaic acid, and phthalic acid, and dihydric alcohols, such as ethylene glycol, diethylene glycol, triethylene glycol, propylene glycol, and dipropylene glycol; and vinyl polymers, such as acrylic plasticizers, prepared by polymerizing vinyl monomers by various methods. Examples of the filler include reinforcing fillers such as wood flour, pulp, cotton chip, asbestos, glass fiber, carbon fiber, mica, walnut shell flour, rice hull flour, graphite, diatomite, white clay, silica (fumed silica, precipitated silica, crystalline silica, fused silica, dolomite, silicic acid anhydride, and hydrated silica), and carbon black; fillers such as calcium carbonate (e.g. heavy calcium carbonate and colloidal calcium carbonate), magnesium carbonate, diatomite, calcined clay, clay, talc, titanium oxide, bentonite, organic bentonite, ferric oxide, ferric oxide red, aluminum fine powder, flint powder, zinc oxide, active zinc oxide, zinc dust, zinc carbonate, and shirasu balloon; and fibrous fillers such as asbestos, glass fiber and filament, carbon fiber, Kevlar fiber, and polyethylene fiber. The curable composition of the present invention may contain a curing agent or curing catalyst, if necessary.

By using an alkenyl-terminated vinyl polymer, a curable composition containing an alkenyl-terminated vinyl polymer (A) and a hydrosilyl-containing compound (curing agent) (B) can be produced.

The alkenyl-terminated vinyl polymer (A) may be of a single component type or a multiple component type.

The hydrosilyl-containing compound (B) is not particularly limited, and various compounds may be used. Examples of the hydrosilyl-containing compound (B) include linear polysiloxanes represented by general formulae (14) and (15):

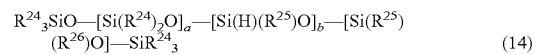

(14)

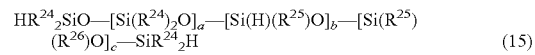

(15)

(wherein $R^{24}$ and $R^{25}$ each represent a $C_1$-$C_6$ alkyl group or a phenyl group; $R^{26}$ represents a $C_1$-$C_{10}$ alkyl group or a $C_7$-$C_{10}$ aralkyl group; a is an integer satisfying $0 \leq a \leq 100$; b is an integer satisfying $2 \leq b \leq 100$; and c is an integer satisfying $0 \leq c \leq 100$), and cyclic siloxanes represented by general formula (16):

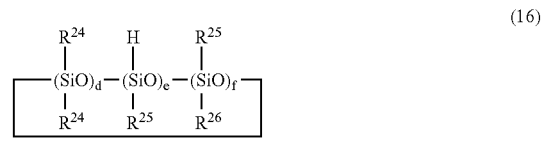

(16)

(wherein $R^{24}$ and $R^{25}$ each represent a $C_1$-$C_6$ alkyl group or a phenyl group; $R^{26}$ represents a $C_1$-$C_{10}$ alkyl group or a $C_7$-$C_{10}$ aralkyl group; d is an integer satisfying $0 \leq d \leq 8$; e is an integer satisfying $2 \leq e \leq 10$; f is an integer satisfying $0 \leq f \leq 8$; and $3 \leq d+e+f \leq 10$).

These hydrosilyl-containing compounds (B) may be used alone or in combination. Among these siloxanes, phenyl-containing linear siloxanes represented by general formula (17):

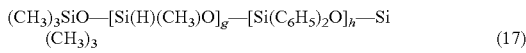

(17)

and general formula (18):

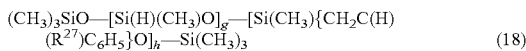

(18)

(wherein $R^{27}$ represents hydrogen or a methyl group; g is an integer satisfying $2 \leq g \leq 100$; h is an integer satisfying $0 \leq h \leq 100$; and $C_6H_5$ represents a phenyl group), and cyclic siloxanes represented by general formula (19):

(19)

and general formula (20)

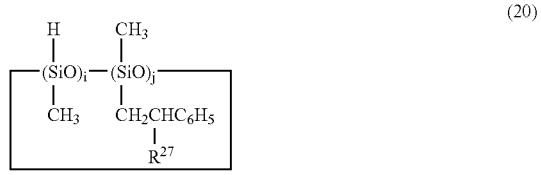

(20)

(wherein $R^{27}$ represents hydrogen or a methyl group; i is an integer satisfying $2 \leq i \leq 10$; j is an integer satisfying $0 \leq j \leq 8$; $3 \leq i+j \leq 10$; and $C_6H_5$ represents a phenyl group).

The hydrosilyl-containing compound (B) may contain at least two hydrosilyl groups. The curing agent containing two or more hydrosilyl groups may be a compound prepared by addition reaction between a hydrosilyl-containing compound represented by one of general formulae (14) to (20) and a low-molecular-weight compound having two or more alkenyl groups per molecule, such that the hydrosilyl groups partially remain after the termination of the addition reaction. Various compounds may be used as the compound having two alkenyl groups per molecule. Examples of such compounds include hydrocarbons such as 1,4-pentadiene, 1,5-hexadiene, 1,6-heptadiene, 1,7-octadiene, 1,8-nonadiene, and 1,9-decadiene; ethers such as O,O'-diallyl bisphenol A and 3,3'-diallyl bisphenol A; esters such as diallyl phthalate, diallyl isophthalate, triallyl trimellitate, and tetraallyl pyromellitate; and carbonates such as diethylene glycol diallyl carbonate. The curable composition of the present invention may be prepared by gradually supplying dropwise the alkenyl-terminated vinyl polymer (A) to an excessive amount of the hydrosilyl-containing compound represented by one of general formulae (14) to (20) in the presence of a hydrosilylation catalyst. Among compounds having two or more hydrosilyl groups, those described below are preferred in view of the availability of the starting materials, ease of removing the excess siloxane, and compatibility with the alkenyl-containing vinyl polymer (A):

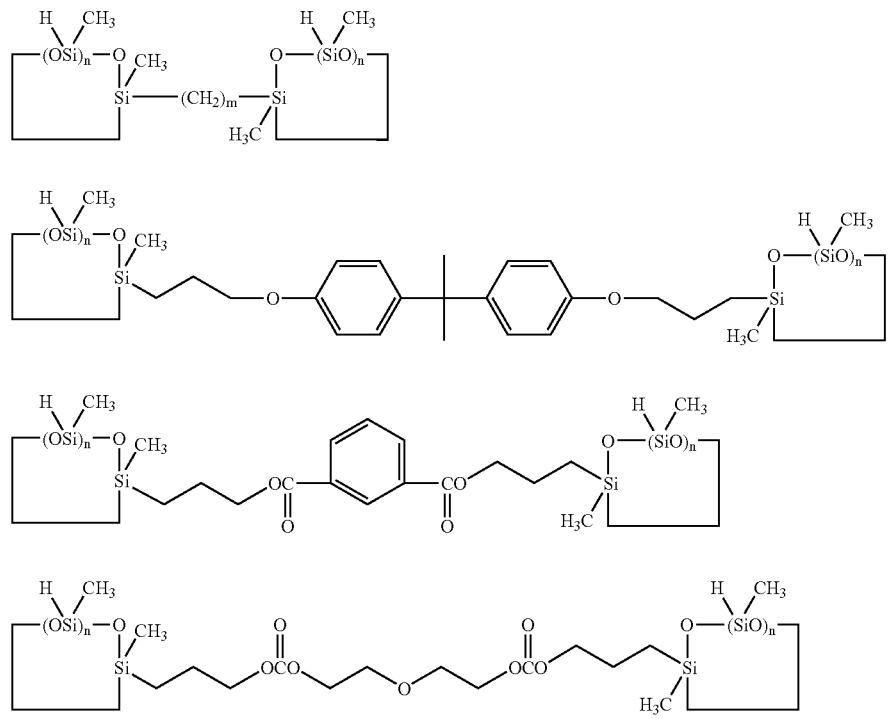

(wherein n is an integer between 2 and 4; and m is an integer between 5 and 10).

The alkenyl-terminated vinyl polymer (A) and the hydrosilyl-containing compound (B) may be mixed at any ratio. Preferably, the molar ratio of the alkenyl groups to the hydrosilyl groups is in the range of 5 to 0.2, and more preferably in the range of 2.5 to 0.4 in view of curability. A molar ratio exceeding 5 results in insufficient cure, and the resulting cured product is sticky and has low strength. At a molar ratio less than 0.2, large quantities of active hydrosilyl groups remain in the product after curing, resulting in generation of cracks and voids. Thus, a homogeneous cured product having a sufficient strength cannot be obtained.

The curing reaction between the alkenyl-terminated vinyl polymer (A) and the hydrosilyl-containing compound (B) proceeds by heating the mixture of these two components. In order to accelerate the reaction, a hydrosilylation catalyst is used. Examples of the hydrosilylation catalyst are described above.

A crosslinkable-silyl-terminated vinyl polymer (C) may be used to produce a curable composition containing this polymer as the main component.

The crosslinkable-silyl-terminated vinyl polymer (C) cures into a three-dimensional structure through crosslinking reaction when the crosslinkable-silyl-terminated vinyl polymer (C) is put into contact with moisture. The rate of hydrolysis depends on the temperature, humidity, and the type of the hydrolyzable group. An appropriate hydrolyzable group must be selected according to the required conditions.

In order to accelerate the curing reaction, a curing catalyst (D) may be supplied. Examples of condensation catalysts include titanates such as tetrabutyl titanate and tetrapropyl titanate; organotin compounds such as dibutyltin dilaurate, dibutyltin maleate, dibutyltin diacetate, tin octylate, and tin naphthenate; amine compounds, such as lead octylate, butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, and 1,3-diazabicyclo(5,4,6)undecene-7, and carboxylates thereof; low-molecular-weight polyamide resins obtained from excessive polyamine and polybasic acid; reaction products of excessive polyamine and epoxy compounds; amino-containing silane coupling agents, e.g., known silanol catalysts such as γ-aminopropyltrimethoxysilane and N-(β-aminoethyl)aminopropylmethyldimethoxysilane. These catalysts may be used alone or in combination. The amount of the catalyst used is preferably 0 to 10 percent by weight of the crosslinkable-silyl-terminated vinyl polymer (C). When the hydrolyzable group Y is an alkoxy group, it is preferable to use a curing catalyst since the curing rate is low with this polymer alone.

When the crosslinkable-silyl-terminated vinyl polymer (C), i.e., the main component, is cured in the presence of the condensation catalyst (D) as required, a homogeneous cured product can be obtained as a result. The curing conditions are not particularly limited but curing is generally conducted at a temperature of 0 to 100° C., and preferably 10 to 50° C., for about one hour to about one week. The characteristics of the cured product depend on the main chain skeleton and the molecular weight of the polymer; and various forms of products, i.e., from rubbery to resinous products, can be obtained.

A curable composition containing a hydroxyl-terminated vinyl polymer (E) as the main component and a compound (F) having at least two functional groups reactive to a hydroxyl group can be produced.

The compound (F) having at least two functional groups reactive to a hydroxyl group is not particularly limited. Examples thereof include polyisocyanate compounds having at least two isocyanate groups per molecule, methylolated melamine and alkyl ethers thereof; aminoplast resins such as low condensates; and polyfunctional carboxylic acids and halides thereof.

As the polyisocyanate compound having at least two isocyanate groups per molecule, those known in the art may be used. Examples of the polyisocyanate compound include isocyanate compounds such as 2,4-tolylene diisocyanate, 2,6-tolylene diisocyanate, 4,4'-diphenylmethane diisocyanate, hexamethylene diisocyanate, xylylene diisocyanate, metaxylylene diisocyanate, 1,5-naphthalene diisocyanate, hydrogenated diphenylmethane diisocyanate, hydrogenated tolylene diisocyanate, hydrogenated xylylene diisocyanate, isophorone diisocyanate, and triisocyanate, e.g., B-45 produced by Ipposha Oil Industries Co., Ltd.; biuret polyisocyanate compounds, such as Sumidur N (produced by Sumitomo-Bayer Urethane Co., Ltd.); polyisocyanate compounds having an isocyanurate ring, such as Desmodurs IL and HL (produced by Bayer A. G.) and Colonate EH (produced by Nippon Polyurethane Kogyo Co., Ltd.); adduct polyisocyanate compounds such as Sumidur L (produced by Sumitomo-Bayer Urethane Co., Ltd.); and adduct polyisocyanate compounds such as Colonate HL (produced by Nippon Polyurethane Kogyo Co., Ltd.). Blocked isocyanates may be used. These compounds may be used alone or in combination.

The mixing ratio of the hydroxyl-terminated vinyl polymer (E) to the compound (F) having at least two isocyanate groups is not particularly limited. For example, the ratio of the isocyanate groups to the hydroxyl groups (NCO/OH, molar ratio) is preferably 0.5 to 3.0, and more preferably 0.8 to 2.0.

If necessary, a known catalyst, such as the organotin compound or the tertiary amine described above, may be supplied to promote the curing reaction between the hydroxyl-terminated vinyl polymer (E) and the compound having at least two isocyanate groups.

The aminoplast resin is not particularly limited. Examples of the aminoplast resin include adducts (methylol compounds) of melamine and formaldehyde, low condensates of melamine and formaldehyde, alkyl ethers thereof, and urea resins. These may be used alone or in combination. A known catalyst, such as paratoluenesulfonic acid or benzenesulfonic acid, may be supplied to promote the curing reaction between the hydroxyl-terminated (meth)acrylic polymer and the aminoplast resin.

The polyfunctional carboxylic acid is not particularly limited. Examples of the polyfunctional carboxylic acid include oxalic acid, malonic acid, succinic acid, glutaric acid, adipic acid, phthalic acid, phthalic anhydride, terephthalic acid, trimellitic acid, pyromellitic acid, maleic acid, maleic anhydride, fumaric acid, and itaconic acid; and anhydrides and halides of these polyfunctional carboxylic acids. These compounds may be used alone or in combination.

A homogeneous cured product with a satisfactorily cured interior can be obtained by reacting the hydroxyl-terminated vinyl polymer (E) with the compound (F) having at least two functional groups reactive to the hydroxyl group in the presence of, if necessary, a curing catalyst. The curing conditions are not particularly limited; however, curing is generally performed at 0 to 100° C., and more preferably at 20 to 80° C.

The characteristics of the cured product depend on the main chain skeletons and the molecular weights of the hydroxyl-terminated vinyl polymer (E) and the compound (F) having at least two functional groups reactive to the hydroxyl group. Various forms of products, i.e., from rubbery to resinous products, can be obtained.

When an epoxy-terminated vinyl polymer is used, a curable composition containing an epoxy-terminated vinyl polymer (G) and a compound (hardener) (H) having at least two carboxyl groups per molecule can be prepared.

As the compound (H) having at least two carboxyl groups per molecule, various compounds may be used. Examples of such compounds include aliphatic amines, aromatic amines, acid anhydrides, urea, melamine, and phenol resins.

The cured product made from the epoxy-terminated vinyl polymer (G) and the compound (F) having at least two carboxyl groups per molecule can be used in, for example, sealing materials, adhesives, pressure-sensitive adhesives, elastic adhesives, paints, powder coatings, foamed products, potting agents for electric and electronic parts, films, molding materials, and artificial marble.

As is described above, a functional-group-terminated vinyl polymer can be produced in the present invention. During the production, the polymerization solvent and the vinyl monomer are recovered after the polymerization while the ability for atomic transfer radical polymerization is maintained, and are reused in high yields. After removing the polymerization solvent and the vinyl monomer for recovery, a functional-group-introducing agent is supplied to the system to introduce functional groups into the polymer. This functional-group-introducing agent can be recovered after the completion of the functional group introduction and reused in high yields. A solvent may be used during the functional group introduction. In other words, according to the present invention, controlled introduction of functional groups to the polymer termini is possible, and the excess functional-group-introducing agent can be reused. Thus, functional-group-terminated polymers can be advantageously produced. Moreover, the resulting functional-group-terminated polymer can be subjected to an appropriate functional group conversion, such as hydrosilylation or epoxidation, or can be mixed with an appropriate crosslinking agent to prepare a curable composition.

The present invention will now be specifically described by way of nonlimiting examples. In the examples and comparative examples below, the term "parts" means "parts by weight" and "percent (%)" means "percent (%) by weight".

In the examples, the number-average molecular weight and the molecular weight distribution (the ratio of the weight-average molecular weight to the number-average molecular weight) were determined by gel permeation chromatography (GPC) calibrated with polystyrene standard samples.

Shodex GPC K-804 (produced by Showa Denko K. K.) packed with crosslinked polystyrene gel was used as the GPC column, and chloroform was used as the GPC solvent (mobile phase). The number of functional groups introduced per polymer molecule was calculated based on the concentration analyzed by $^1$H-NMR analysis and on the number-average molecular weight determined by GPC.

EXAMPLE 1

In a 250 L pressure reactor, 1.01 kg (7.02 mol) of copper(I) bromide and 10.6 kg of acetonitrile were charged, and were stirred under a nitrogen gas stream at 65° C. for 16 minutes under heating. To the resulting mixture, 2.11 kg (5.85 mol) of diethyl 2,5-dibromoadipate and 24.0 kg (187 mol) of butyl acrylate were supplied, and the mixture was stirred for 40 minutes at 65° C. under heating. Subsequently, 20.3 g (0.117 mol) of pentamethyldiethylenetriamine was supplied to initiate reaction, and the stirring was continued at 80° C. under heating. To the mixture, 101.5 g (0.585 mol) of pentamethyldiethylenetriamine was supplied. Forty six minutes after the initiation of the reaction, 96.0 kg (749 mol) of butyl acrylate was intermittently supplied dropwise over 180 minutes. During this time period, 81.2 g (0.468 mol) of pentamethyldiethylenetriamine was supplied to the mixture. The butyl acrylate conversion rate reached 95.9% 346 minutes after the initiation of the reaction. The pressure in the reactor was reduced to remove volatile components. To the mixture, 31.7 kg of acetonitrile (dielectric constant: 38), 12.9 kg (117 mol) of 1,7-octadiene (dielectric constant: 1 to 3), and 406 g (2.34 mol) of pentamethyldiethylenetriamine were supplied 434 minutes after the initiation of the reaction. The stirring was continued at 80° C. under heating. The heating was stopped 809 minutes after the initiation of the reaction. A solution containing a polymer [1] was obtained as a result. The polymer [1] had a number-average molecular weight of 26,400 and a molecular weight distribution of 1.23. According to $^1$H-NMR analysis, the number of alkenyl groups per polymer molecule was 1.9, and the number of polymer termini having no alkenyl groups was zero.

EXAMPLE 2

A mixture containing the polymer [1] was concentrated. The residue mixture was diluted with methylcyclohexane and solid components were removed. To the resulting methylcyclohexane solution of the polymer, 4 parts of adsorbents (2 parts of Kyowaad 500SH and 2 parts of Kyowaad 700SL, produced by Kyowa Chemical Industry Co., Ltd.) to 100 parts of the polymer were supplied. The resulting mixture was stirred under heating in a mixed-gas atmosphere of oxygen and nitrogen. Solid components were removed, and the polymer solution was concentrated to obtain a polymer [1']. The molecular weight distribution of the polymer [1'] was 1.30.

COMPARATIVE EXAMPLE 1

In a 500 mL flask, 2.52 g (17.6 mmol) of copper(I) bromide and 33.6 mL (26.4 g) of acetonitrile were charged and stirred under a nitrogen gas stream at 70° C. for 30 minutes under heating. To the resulting mixture, 5.27 g (14.6 mmol) of diethyl 2,5-dibromoadipate and 336 mL (300 g, 2.34 mol) of butyl acrylate were supplied, and the resulting mixture was stirred at 70° C. for 20 minutes under heating. To the resulting mixture, 0.122 mL (0.101 g, 0.585 mmol) of pentamethyldiethylenetriamine was supplied to initiate reaction. The stirring was continued at 80° C. under heating, and 0.366 mL (0.303 g, 1.76 mmol) of pentamethyldiethylenetriamine was supplied. The butyl acrylate conversion rate reached 98.6% 200 minutes after the initiation of the reaction. To the resulting mixture, 43.2 mL (32.2 g, 0.293 mol) of 1,7-octadiene and 1.22 mL (1.01 g, 5.85 mmol) of pentamethyldiethylenetriamine were supplied, and the resulting mixture was stirred at 80° C. under heating. The heating was stopped 440 minutes after the initiation of the reaction, and a solution containing a polymer [4] was obtained as a result. The polymer [4] had a number-average molecular weight of 26,800 and a molecular weight distribution of 1.32. The number of alkenyl groups per polymer molecule determined by $^1$H-NMR analysis was 2.9. The number of polymer termini having no alkenyl groups was 0.3.

COMPARATIVE EXAMPLE 2

A mixture containing the polymer [4] was processed as in EXAMPLE 2 to obtain a polymer [4']. The molecular weight distribution of the polymer [4'] was 1.51.

EXAMPLE 3

In a 2 L flask, 8.39 g (58.5 mmol) of copper(I) bromide and 112 mL (87.9 g) of acetonitrile were charged and stirred under a nitrogen gas stream at 70° C. for 20 minutes under heating. To the resulting mixture, 17.6 g (48.8 mmol) of diethyl 2,5-dibromoadipate and 224 mL (200 g, 1.56 mol) of butyl acrylate were supplied, and the resulting mixture was stirred at 80° C. for 40 minutes under heating. To the resulting mixture, 0.41 mL (0.338 g, 1.95 mmol) of pentamethyldiethylenetriamine was supplied to initiate reaction. To the resulting mixture, 1.23 mL (1.01 g, 5.85 mmol) of pentamethyldiethylenetriamine was supplied, and the stirring was continued at 80° C. under heating. Thirty-five minutes after the initiation of the reaction, 895 mL (800 g, 6.24 mol) of butyl acrylate was intermittently supplied dropwise over 145 minutes. During this time period, 0.41 mL (0.338 g, 1.95 mmol) of pentamethyldiethylenetriamine was supplied. The butyl acrylate conversion rate reached 95.9% 240 minutes after the initiation of the reaction. The pressure in the reactor is reduced to remove volatile components. To the resulting mixture, 336 mL (264 g) of acetonitrile, 144 mL (107 g, 0.975 mol) of 1,7-octadiene, and 4.1 mL (3.38 g, 19.5 mmol) of pentamethyldiethylenetriamine were supplied 360 minutes after the initiation of the reaction. The stirring was continued at 80° C. under heating. The heating was stopped 740 minutes after the initiation of the reaction. A solution containing a polymer [2] was obtained as a result. The polymer [2] had a number-average molecular weight of 24,000 and a molecular weight distribution of 1.17. The number of alkenyl groups per polymer molecule determined by $^1$H-NMR analysis was 1.7. The number of polymer termini having no alkenyl groups was zero.

EXAMPLE 4

A mixture containing the polymer [2] was concentrated. The residue mixture was diluted with toluene to remove solid components. To the resulting toluene solution of the polymer, 4 parts of adsorbents (2 parts of Kyowaad 500SH and 2 parts of Kyowaad 700SL, produced by Kyowa Chemical Industry Co., Ltd.) to 100 parts of the polymer were supplied. The resulting mixture was stirred under heating under a mixed-gas atmosphere of oxygen and nitrogen. After removal of solid components, the polymer solution was concentrated. The residue solution was diluted with N,N-dimethylacetoamide, and the resulting solution was stirred for 8 hours at 100° C. under heating in the presence of potassium acetate. The polymer solution was concentrated and diluted with toluene to remove solid components. To the resulting solution of the polymer, 50 parts of an adsorbent (50 parts of Kyowaad 700PEL, produced by Kyowa Chemical Industry Co., Ltd.) to 100 parts of the polymer was supplied, and the resulting mixture was stirred under heating under a mixed-gas atmosphere of oxygen and nitrogen. After removal of solid components, the solution was concentrated to obtain a polymer. The polymer was then mixed with dimethoxymethylsilane (3 molar equivalents of alkenyl groups), methyl ortho-formate (1 molar equivalent of alkenyl groups), and a platinum catalyst (30 mg of platinum per 1 kg of the polymer), i.e., a xylene solution of a bis(1,3-divinyl-1,1,3,3-tetramethyldisiloxane) platinum complex, hereinafter simply referred to as "platinum catalyst". The resulting mixture was stirred under a nitrogen atmosphere at 80° C. for 1 hour under heating. The disappearance of the alkenyl groups by the reaction was confirmed by $^1$H-NMR analysis. The reaction mixture was then concentrated to obtain a target methoxysilyl-containing polymer [2']. The polymer [2'] had a number-average molecular weight of 25,600 and a molecular weight distribution of 1.26. The number of silyl groups introduced per polymer molecule was 1.8.

EXAMPLE 5

A mixture of 100 parts of the methoxysilyl-containing polymer [2'] obtained in EXAMPLE 4, 150 parts of calcium carbonate (Hakuenka CCR, produced by Shiraishi Kogyo Kaisha, Ltd.), and 50 parts of DOP (dioctyl phthalate, produced by Kyowa Hakko Kogyo Co., Ltd.) was thoroughly mixed with three paint rollers. The resulting mixture was aged in the presence of a tetravalent Sn catalyst (dibutyltin diacetylacetonate) for two days indoor and three days at 50° C. to obtain a cured sheet. The tensile characteristics of the cured sheet were evaluated (Autograph available from Shimadzu Corporation, measuring temperature: 23° C., stress rate: 200 mm/sec, No. 2(1/3) dumbbell specimen). The strength at break was 0.77 MPa and the elongation at break was 430%.

COMPARATIVE EXAMPLE 3

In a 20 L reactor equipped with a reflux tube and a stirrer, 83.9 g (0.585 mol) of copper(I) bromide was charged, and the reactor was purged with nitrogen gas. Into the reactor, 879 g of acetonitrile was supplied, and the resulting mixture was stirred in an oil bath at 70° C. for 45 minutes. To the resulting mixture, 2.00 kg (25.6 mol) of butyl acrylate, diethyl 2,5-dibromoadipate (176 g, 0.488 mol), and 4.07 mL (3.38 g, 19.5 mmol) of pentamethyldiethylenetriamine were supplied to initiate reaction. To the resulting mixture, 8.14 mL (6.76 g, 39.0 mmol) of pentamethyldiethylenetriamine was supplied, followed by stirring under heating at 70° C. Sixty minutes after the initiation of the reaction, 8.00 kg (102 mol) of the butyl acrylate was continuously supplied dropwise over 170 minutes, during which 8.14 mL (6.76 g, 39.0 mmol) of pentamethyldiethylenetriamine was also supplied. The butyl acrylate conversion rate reached 96.7% 450 minutes after the initiation of the reaction. To the resulting mixture, 2.88 L (2.15 kg, 19.5 mol) of 1,7-octadiene and 30.5 mL (25.4 g, 146 mmol) of pentamethyldiethylenetriamine were supplied, followed by stirring at 70° C. for 240 minutes under heating.

The reaction mixture was diluted with toluene to remove solid components. The resulting mixture was passed through an active alumina column, and the volatile components of the mixture were removed by reduced-pressure distillation. An alkenyl-terminated polymer [5] was obtained as a result.

The polymer [5] had a number-average molecular weight of 25,100 and a molecular weight distribution of 1.34. The average number of alkenyl groups per polymer molecule determined by $^1$H-NMR analysis was 3.1.

COMPARATIVE EXAMPLE 4

The polymer [5] was diluted with N,N-dimethylacetoamide and the resulting solution was stirred under heating at 100° C. for 8 hours in the presence of potassium acetate. After heating under a reduced pressure, the solution was diluted with toluene and solid components were removed. To the resulting toluene solution of the polymer, 15 parts of adsorbents (10 parts of Kyowaad 500SH/5 parts of Kyowaad 700SL, produced by Kyowa Chemical Industry Co., Ltd.) to 100 parts of the polymer were supplied, and the resulting mixture was stirred under heating at 130° C. After the solid components were removed, the polymer solution was concentrated to obtain a polymer. The polymer was mixed with dimethoxymethylsilane (3 molar equivalents of alkenyl groups), methyl ortho-formate (1 molar equivalent of alkenyl groups), and a platinum catalyst (60 mg of platinum per 1 kg of the polymer). The resulting mixture was stirred for 5 hours under heating at 100° C. After the disappearance of alkenyl groups due to the reaction was confirmed by $^1$H-NMR analysis, the reaction mixture was concentrated to obtain a target methoxysilyl-containing polymer [5']. The methoxysilyl-containing polymer [5'] had a number-average molecular weight of 28,900 and a molecular weight distribution of 1.90. The number of silyl groups introduced per polymer molecule was 1.9.

COMPARATIVE EXAMPLE 5

A mixture of 100 parts of the methoxysilyl-containing polymer [5'] obtained in COMPARATIVE EXAMPLE 4, 150 parts of calcium carbonate (Hakuenka CCR, produced by Shiraishi Kogyo Kaisha, Ltd.), and 50 parts of DOP (dioctyl phthalate, produced by Kyowa Hakko Kogyo Co., Ltd.) was thoroughly mixed with three paint rollers. The resulting mixture was aged in the presence of a tetravalent Sn catalyst (dibutyltin diacetylacetonate) for two days indoor and three days at 50° C. to obtain a cured sheet. The tensile characteristics of the cured sheet were evaluated (Autograph available from Shimadzu Corporation, measuring temperature: 23° C., stress rate: 200 mm/sec, No. 2(1/3) dumbbell specimen). The strength at break was 0.95 MPa and the elongation at break was 320%.

EXAMPLE 6

In a 250 L pressure reactor, 1.11 kg (7.72 mol) of copper(I) bromide and 9.95 kg of acetonitrile were charged and stirred under a nitrogen gas stream at 65° C. for 15 minutes under heating. To the resulting mixture, 3.09 kg (8.58 mol) of diethyl 2,5-dibromoadipate, 6.60 kg (51.5 mol) of butyl acrylate, 9.49 kg (94.7 mol) of ethyl acrylate, and 7.77 kg (59.7 mol) of 2-methoxyethyl acrylate were supplied. The resulting mixture was stirred at 65° C. for 43 minutes under heating, and 22.3 g (0.129 mol) of pentamethyldiethylenetriamine was supplied to initiate reaction. The stirring was continued at 80° C. under heating, and 112 g (0.644 mol) of pentamethyldiethylenetriamine was supplied. Fifty seven minutes after the initiation of the reaction, 26.4 kg (206 mol) of butyl acrylate, 37.9 kg (379 mol) of ethyl acrylate, and 31.3 kg (239 mol) of 2-methoxyethyl acrylate were intermittently supplied dropwise over 180 minutes. During this time period, 89.2 g (0.515 mol) of pentamethyldiethylenetriamine was also supplied. The pressure in the reactor was reduced 602 minutes after the initiation of the reaction to remove volatile components. The average of the conversion rates of the ethyl acrylate, butyl acrylate, and 2-methoxyethyl acrylate reached 95.3% 720 minutes after the initiation of the reaction. To the resulting mixture, 9.95 kg of acetonitrile, 28.4 kg (257 mol) of 1,7-octadiene, 446 g (2.57 mol) of pentamethyldiethylenetriamine were supplied, and the stirring was continued at 80° C. under heating. The heating was stopped 1,340 minutes after the initiation of the reaction. A solution containing a polymer [3] was obtained as a result. The polymer [3] had a number-average molecular weight of 17,100 and a molecular weight distribution of 1.16. The number of alkenyl groups per polymer molecule determined by $^1$H-NMR analysis was 1.6. The number of polymer termini having no alkenyl groups was zero.

EXAMPLE 7

The solution of a mixture containing the polymer [3] was concentrated and then diluted with toluene to remove solid components. The resulting toluene solution of the polymer was mixed with 4 parts of adsorbents (2 parts of Kyowaad 500SH and 2 parts of Kyowaad 700SL, produced by Kyowa Chemical Industry Co., Ltd.) to 100 parts of the polymer, and the resulting mixture was stirred under heating under a mixed-gas atmosphere of oxygen and nitrogen. After the solid components were removed, the polymer solution was concentrated. The residue solution was diluted with N,N-dimethylacetoamide, and the resulting solution was stirred for 8 hours at 100° C. under heating in the presence of potassium acetate. The polymer solution was then concentrated. The toluene solution of the polymer was then mixed with 10 parts of adsorbents (5 parts of Kyowaad 500SH/5 parts of Kyowaad 700SL, produced by Kyowa Chemical Industry Co., Ltd.) to 100 parts of the polymer. The resulting mixture was stirred under heating under a mixed-gas atmosphere of oxygen and nitrogen. After removal of solid components, the polymer solution was concentrated to obtain a polymer [3'].

EXAMPLE 8

A mixture of 100 parts of the polymer [3'] and 1.8 molar equivalent of a linear siloxane (containing, on average, five hydrosilyl groups and five substituents [—CH$_2$—CH(CH$_3$)—C$_6$H$_5$] per molecule; the Si—H group content being 3.70 mmol/g) relative to alkenyl group was prepared. A platinum catalyst (10 to 100 mg relative to 1 kg of polymer based on platinum) was supplied to the mixture. The resulting mixture was homogeneously mixed and was rapidly cured by heating at 130° C. A rubbery product was obtained as a result. The tensile characteristics of the product were evaluated using Autograph available from Shimadzu Corporation (measuring temperature: 23° C., stress rate: 200 mm/sec, No. 2(1/3) dumbbell specimen). The strength at break was 0.55 MPa and the elongation at break was 230%.

COMPARATIVE EXAMPLE 6

In a 50 L reactor, 270 g (1.88 mol) of copper(I) bromide and 2.43 kg of acetonitrile were charged and stirred at 65° C. for 19 minutes under heating under a nitrogen gas stream. To the resulting mixture, 753 g (2.09 mol) of diethyl 2,5-dibromoadipate, 1.61 kg (12.6 mol) of butyl acrylate, 2.31 kg (23.1 mol) of ethyl acrylate, and 1.90 kg (14.6 mol) of 2-methoxyethyl acrylate were supplied, and the resulting mixture was stirred at 80° C. for 30 minutes under heating. To the resulting mixture, 13.1 mL (10.8 g, 62.8 mmol) of pentamethyldiethylenetriamine was supplied to initiate reaction. Another 26.2 mL (21.6 g, 126 mmol) of pentamethyldiethylenetriamine was supplied, and the stirring was continued at 80° C. under heating. Sixty five minutes after the initiation of the reaction, 6.44 kg (50.4 mol) of butyl acrylate, 9.24 kg (92.4 mol) of ethyl acrylate, and 7.60 kg (58.4 mol) of 2-methoxyethyl acrylate were intermittently supplied dropwise over 103 minutes. During this time period, 26.2 mL (21.6 g, 126 mmol) of pentamethyldiethylenetriamine was further supplied. The average of the conversion rates of the ethyl acrylate, butyl acrylate, and 2-methoxyethyl acrylate reached 96.8% 305 minutes after the initiation of the reaction. To this mixture, 6.92 kg (62.8 mol) of 1,7-octadiene and 131 mL (109 g, 0.628 mol) of pentamethyldiethylenetriamine were supplied, and the stirring was continued at 80° C. under heating. The heating was stopped 605 minutes after the initiation of the reaction. A solution containing a polymer [6] was obtained as a result. The polymer [6] had a number-average molecular weight of 17,000 and a molecular weight distribution of 1.13. The number of alkenyl groups per polymer molecule determined by $^1$H-NMR analysis was 2.5.

COMPARATIVE EXAMPLE 7

A mixture containing the polymer [6] was heated under a reduced pressure and diluted with toluene to remove solid components. The resulting solution was diluted with N,N-dimethylacetoamide. The diluted solution was stirred for 8 hours at 100° C. under heating in the presence of potassium acetate. The resulting solution was heated under a reduced pressure and diluted with toluene to remove solid components. The toluene solution of the polymer was mixed with 15 parts of adsorbents (10 parts of Kyowaad 500SH/5 parts of Kyowaad 700SL, produced by Kyowa Chemical Industry Co., Ltd.) to 100 parts of the polymer. The resulting mixture was stirred at 130° C. under heating. Solid components were then removed, and the polymer solution was concentrated. A polymer [6'] was obtained as a result.

COMPARATIVE EXAMPLE 8

A mixture of 100 parts of the polymer [6'] and 1.8 molar equivalent of a linear siloxane (containing, on average, five hydrosilyl groups and five substituents [—$CH_2$—CH($CH_3$)—$C_6H_5$] per molecule; the Si—H group content being 3.70 mmol/g) relative to alkenyl groups was prepared. A platinum catalyst (10 to 100 mg relative to 1 kg of polymer based on platinum) was supplied to the mixture. The resulting mixture was homogeneously mixed and was rapidly cured by heating at 130° C. A rubbery product was obtained as a result. The tensile characteristics of the product were evaluated (Autograph available from Shimadzu Corporation, measuring temperature: 23° C., stress rate: 200 mm/sec, No. 2(1/3) dumbbell specimen). The strength at break was 0.61 MPa and the elongation at break was 160%.

The results are shown in Tables below.

TABLE 1

| Example | Polymer | Number-average molecular weight (Mn) | Molecular weight distribution (Mw/Mn) | Fn (alkenyl) | Fn (Br) |
|---|---|---|---|---|---|
| 1 | 1 | 26,400 | 1.23 | 1.9 | 0.0 |
| 2 | 1' | — | 1.30 | — | — |
| Comparative Example 1 | 4 | 26,800 | 1.32 | 2.9 | 0.3 |
| Comparative Example 2 | 4' | — | 1.51 | — | — |

*Fn (alkenyl): the number of alkenyl groups per polymer molecule.
Fn (Br): the number of termini having no functional groups introduced per polymer molecule.
"—": Not determined

TABLE 2

| Example | Polymer | Number-average molecular weight (Mn) | Molecular weight distribution (Mw/Mn) | Fn (alkenyl) | Fn (Br) | Fn (Si) | Tb (MPa) | Eb (%) |
|---|---|---|---|---|---|---|---|---|
| 3 | 2 | 24,000 | 1.27 | 1.7 | 0 | — | — | — |
| 4 | 2' | 25,600 | 1.26 | — | 0 | 1.8 | — | — |
| 5 | 2' | — | — | — | — | — | 0.77 | 430 |
| Comparative Example 3 | 5 | 25,100 | 1.34 | 3.1 | — | — | — | — |
| Comparative Example 4 | 5' | 28,900 | 1.90 | — | — | 1.9 | — | — |
| Comparative Example 5 | 5' | — | — | — | — | — | 0.95 | 320 |

*Fn (alkenyl): the number of alkenyl groups per polymer molecule.
Fn (Br): the number of termini having no functional groups introduced per polymer molecule.
Fn (Si): the number of silyl groups per polymer molecule.
Tb: tensile strength at break
Eb: elongation at break.
"—": Not determined.

TABLE 3

| Example | Polymer | Number-average molecular weight (Mn) | Molecular weight distribution (Mw/Mn) | Fn (alkenyl) | Fn (Br) | Tb (MPa) | Eb (%) |
|---|---|---|---|---|---|---|---|
| 6 | 3 | 17,100 | 1.16 | 1.6 | 0 | — | — |
| 7 | 3' | — | — | — | — | — | — |
| 8 | 3' | — | — | — | — | 0.55 | 230 |
| Comparative Example 6 | 6 | 17,000 | 1.13 | 2.5 | — | — | — |
| Comparative Example 7 | 6' | — | — | — | — | — | — |
| Comparative Example 8 | 6' | — | — | — | — | 0.61 | 160 |

*Fn (alkenyl): the number of alkenyl groups per polymer molecule.
Fn (Br): the number of termini having no functional groups introduced per polymer molecule.
Tb: tensile strength at break.
Eb: elongation at break.
"—": Not determined.

According to the method of the present invention, a polymer having a terminal functional group was produced without fail. Table 1 shows that the termini having no functional groups adversely affect the heat stability of the resulting polymer. Since the polymers produced according to the present invention had functional groups at the termini, the polymers exhibited higher heat stability. Tables 2 and 3 show that all of the polymers obtained by the method of the present invention had terminal functional groups. Thus, the cured products made from these polymers exhibited satisfactory elongation.

COMPARATIVE EXAMPLE 9

In a 500 ml round bottomed flask equipped with a reflux tube and a stirrer, 2.51 g (17.55 mmol) of copper(I) bromide was charged, and the reactor was purged with nitrogen gas. Into the reactor, 33.56 ml of acetonitrile was supplied and stirred for 30 minutes at 80° C. in an oil bath. Into the reactor, 335.6 ml (2.34 mol) of butyl acrylate and 3.51 g (9.76 mmol) of diethyl 2,5-dibromoadipate were supplied, and the mixture was stirred for 25 minutes at 80° C. To the resulting mixture, 0.1222 ml (0.59 mmol) of pentamethyldiethylenetriamine was supplied to initiate reaction. One hundred fifty minutes after the initiation of the reaction, 12.9 ml (0.0872 mol) of 1,7-octadiene was supplied, and the stirring was further continued for 360 minutes. A total of 1.22 ml of pentamethyldiethylenetriamine was supplied 90, 180, and 270 minutes after the addition of the octadiene.

The reaction mixture was diluted with toluene in a volume three times greater than that of the reaction mixture to filter out the solid components. A solution containing an alkenyl-terminated polymer [7] was obtained as a result.

The polymer [7] had a number-average molecular weight of 30,600 and a molecular weight distribution of 1.28. The average number of alkenyl groups per polymer molecule determined by $^1$H-NMR analysis was 2.28.

EXAMPLE 9

In a 500 ml round bottomed flask equipped with a reflux tube and a stirrer, 2.51 g (17.55 mmol) of copper(I) bromide was charged, and the reactor was purged with nitrogen gas. Into the reactor, 33.56 ml of acetonitrile was supplied and stirring was performed for 30 minutes at 80° C. in an oil bath. Into the reactor, 335.6 ml (2.34 mol) of butyl acrylate and 3.51 g (9.76 mmol) of diethyl 2,5-dibromoadipate were supplied, and the mixture was stirred for 25 minutes at 80° C. To the resulting mixture, 0.1222 ml (0.59 mmol) of pentamethyldiethylenetriamine was supplied to initiate reaction. One hundred fifty minutes after the initiation of the reaction, the pressure inside the reactor was gradually reduced using a vacuum pump at 80° C. to recover the acetonitrile and unreacting butyl acrylate (the pressure was ultimately reduced to 5 Torr, i.e., about 666.6 PA). The recovery under reduced pressure was continued for 1 hour. After gas chromatographic analysis confirmed ND (no detection) for the acetonitrile in the polymer, 12.9 ml (0.0872 mol) of 1,7-octadiene and acetonitrile in an amount equal to that at the time of polymerization were supplied. The stirring was continued for 360 minutes after the addition of 1,7-octadiene. A total of 1.22 ml of pentamethyldiethylenetriamine was supplied 90, 180, and 270 minutes after the addition of the octadiene. The pressure in the reactor was reduced with a vacuum pump 360 minutes after the addition of 1,7-octadiene so as to recover acetonitrile and unreacting 1,7-octadiene.

The reaction mixture was diluted with toluene in a volume three times greater than that of the reaction mixture to filter out the solid components. A solution containing an alkenyl-terminated polymer [8] was obtained as a result.

The polymer [8] had a number-average molecular weight of 31,000 and a molecular weight distribution of 1.33. The average number of alkenyl groups per polymer molecule determined by $^1$H-NMR analysis was 2.3.

EXAMPLE 10

In a 100 ml round bottomed flask equipped with a reflux tube and a stirrer, 0.375 g (2.62 mmol) of copper(I) bromide was charged, and the reactor was purged with nitrogen gas. Into the reactor, 5.0 ml of acetonitrile recovered in EXAMPLE 9 was supplied, and the mixture was stirred for 30 minutes at 80° C. in an oil bath. To the resulting mixture, 50 ml (0.349 mol) of butyl acrylate and 0.78 g (2.18 mmol) of diethyl 2,5-dibromoadipate were supplied, and the stirring was further continued at 80° C. for 25 minutes. To the resulting mixture, 0.0182 ml (0.09 mmol) of pentamethyldiethylenetriamine was supplied to initiate reaction. One hundred fifty minutes after the initiation of the reaction, the pressure in the reactor was reduced using a vacuum pump to recover acetonitrile and unreacting butyl acrylate. The recovery under reduced pressure was continued for 1 hour. After gas chromatographic analysis confirmed ND (no detection) for the acetonitrile in the polymer, 11.4 ml a mixed solution of 1,7-octadiene and acetonitrile recovered in EXAMPLE 9 was supplied, and the stirring was continued for 360 minutes. A total of 0.0273 ml of pentamethyldiethylenetriamine was supplied 90, 180, and 270 minutes after the addition of the mixed solution of 1,7-octadiene and acetonitrile.

The reaction mixture was diluted with toluene in a volume three times greater than that of the reaction mixture to filter out solid components. A solution containing an alkenyl-terminated polymer [9] was obtained as a result.

The polymer [9] had a number-average molecular weight of 31,200 and a molecular weight distribution of 1.42. The average number of alkenyl groups per polymer molecule determined by $^1$H-NMR analysis was 2.6.

EXAMPLES 9 and 10 and COMPARATIVE EXAMPLE 9 show that, according to the production method of the present invention, the functional-group-introducing agent and the functional-group-introducing solvent can be recovered and recycled in high yields.

INDUSTRIAL APPLICABILITY

According to the present invention, polymers having various terminal functional groups can be easily produced by supplying compounds (functional-group-introducing agents) containing olefins having a low polymerizability and various functional groups to various polymerization systems of vinyl monomers. Moreover, according to the present invention, functional groups can be reliably introduced into termini of vinyl polymers. Vinyl polymers having one functional group introduced into each terminus through a carbon-carbon bond are stable and can be used in curable composition applications.

Furthermore, according to the production method of the present invention, the polymerization solvent, the functional-group-introducing agent, and the functional-group-introducing solvent can be recovered and recycled in high yields.

What is claimed is:

1. A method for making a vinyl polymer having a terminus to which a functional-group-introducing agent is added, comprising:
supplying the functional-group-introducing agent having a low polymerizability and a functional-group-introducing solvent having a dielectric constant higher than that of the functional-group-introducing agent to a polymerization system after 80 percent by weight or more of a vinyl monomer is consumed by atom transfer radical polymerization in a polymerization solvent in the presence of a polymerization initiator and a transition metal complex functioning as a polymerization catalyst, and
adding the functional-group-introducing agent to the terminus of the vinyl polymer by addition reaction,
wherein 1 to 1,000 parts by weight of the functional-group-introducing solvent to 100 parts by weight of the vinyl monomer is supplied.

2. The method according to claim 1, wherein the polymerization solvent and the vinyl monomer are removed by reduced-pressure distillation while the ability for atom transfer radical polymerization is maintained, the reduced-pressure distillation being performed after 80 percent by weight or more of the vinyl monomer is consumed and before the functional-group-introducing agent having a low polymerizability and the functional-group-introducing solvent having a dielectric constant higher than that of the functional-group-introducing agent are supplied.

3. The method according to claim 1, wherein the functional-group-introducing agent is a compound represented by general formula (1):

wherein $R^3$ represents a hydroxyl group, an amino group, an epoxy group, a carboxylic acid group, an ester group, an ether group, an amido group, a silyl group, a group represented by general formula (2):

wherein $R^4$ represents a hydrogen atom or a methyl group, or a $C_1$-$C_{20}$ organic group; $R^1$ represents a $C_1$-$C_{20}$ alkylene group or a group represented by general formula (3):

wherein $R^5$ is a $C_1$-$C_{20}$ organic group which may contain an oxygen atom or a nitrogen atom; and $R^6$s each represent a hydrogen atom or a methyl group and may be the same or different; and $R^2$ represents a hydrogen atom or a methyl group.

4. The method according to claim 1, wherein the functional-group-introducing agent is a compound represented by general formula (4):

wherein $R^1$ represents a $C_1$-$C_{20}$ alkylene group or a group represented by general formula (3):

wherein $R^5$ is a $C_1$-$C_{20}$ organic group which may contain an oxygen atom or a nitrogen atom; and $R^6$s each represent a hydrogen atom or a methyl group and may be the same or different; and $R^2$ and $R^4$ each represent a hydrogen atom or a methyl group.

5. The method according to claim 1, wherein the functional-group-introducing agent is a compound represented by general formula (5):

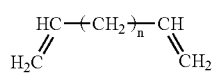

(5)

wherein n is an integer between 1 and 20.

6. The method according to claim 1, wherein the functional-group-introducing agent is 1,5-hexadiene, 1,7-octadiene, or 1,9-decadiene.

7. The method according to claim 1, wherein $R^3$ in general formula (1) is selected from a hydroxyl group, an amino group, an epoxy group, a carboxylic acid group, an ester group, an ether group, an amido group, and a silyl group.

8. The method according to claim 1, wherein an excess amount of the functional-group-introducing agent relative to the propagating termini of the polymer is supplied.

9. The method according to claim 1, wherein the dielectric constant of the functional-group-introducing solvent is at least 3 higher than the dielectric constant of the functional-group-introducing agent.

10. The method according to claim 1, wherein the functional-group-introducing solvent is a nitrile compound.

11. The method according to claim 1, wherein 1 to 10,000 parts by weight of the functional-group-introducing solvent to 100 parts by weight of the functional-group-introducing agent is supplied.

12. The method according to claim 1, wherein the vinyl polymer is a (meth)acrylic polymer.

13. The method according to claim 1, wherein the number-average molecular weight of the vinyl polymer is 500 to 100,000.

14. The method according to claim 1, wherein the molecular weight distribution of the vinyl polymer is less than 1.8.

15. The method according to claim 1, wherein the central metal of the transition metal complex is a Group VIII, IX, X or XI element in the periodic table.

16. The method according to claim 1, wherein the ligand of the transition metal complex is a polyamine compound.

17. The method according to claim 1, wherein the polymerization initiator is a functional-group-containing organohalide compound or a functional-group-containing sulfonyl halide compound.

18. The method according to claim 1, wherein the polymerization initiator is a polyfunctional initiator.

19. The method according to claim 2, wherein the polymerization solvent and the monomer removed by the reduced-pressure distillation are recovered and reused as a polymerization solvent and a monomer.

20. The method according to claim 1, wherein the functional-group-introducing agent or a mixture of the functional-group-introducing agent and the functional-group-introducing solvent is removed by reduced-pressure distillation after the functional group is bound to a terminus of the vinyl polymer by supplying the functional-group-introducing agent.

21. The method according to claim 20, wherein the functional-group-introducing agent or the mixture of the functional-group-introducing agent and the functional-group-introducing solvent removed by the reduced-pressure distillation is recovered and reused as a functional-group-introducing agent or a mixture of a functional-group-introducing agent and a functional-group-introducing solvent.

* * * * *